(12) United States Patent
Sangoli

(10) Patent No.: US 11,461,535 B2
(45) Date of Patent: Oct. 4, 2022

(54) VIDEO BUFFERING FOR INTERACTIVE VIDEOS USING A MARKUP LANGUAGE

(71) Applicant: Bank of America Corporation, Charlotte, NC (US)

(72) Inventor: Shankar Sangoli, Langhorne, PA (US)

(73) Assignee: Bank of America Corporation, Charlotte, NC (US)

( * ) Notice: Subject to any disclaimer, the term of this patent is extended or adjusted under 35 U.S.C. 154(b) by 17 days.

(21) Appl. No.: 16/885,048

(22) Filed: May 27, 2020

(65) Prior Publication Data
US 2021/0374328 A1 Dec. 2, 2021

(51) Int. Cl.
| | |
|---|---|
| *G06F 40/143* | (2020.01) |
| *G06T 13/80* | (2011.01) |
| *H04L 65/60* | (2022.01) |
| *H04N 21/44* | (2011.01) |
| *G06F 3/0481* | (2022.01) |
| *G06F 9/451* | (2018.01) |

(52) U.S. Cl.
CPC .......... *G06F 40/143* (2020.01); *G06F 3/0481* (2013.01); *G06T 13/80* (2013.01); *H04L 65/60* (2013.01); *H04N 21/44004* (2013.01); *G06F 9/451* (2018.02)

(58) Field of Classification Search
CPC ...... G06F 40/143; G06F 3/0481; G06F 9/451; G06T 13/80; H04L 65/60; H04N 21/44004
See application file for complete search history.

(56) References Cited

U.S. PATENT DOCUMENTS

| | | |
|---|---|---|
| 4,800,431 A | 1/1989 | Deering |
| 5,189,516 A | 2/1993 | Angell et al. |
| 5,319,457 A | 6/1994 | Nakahashi et al. |
| 5,420,608 A | 5/1995 | Choi et al. |
| 5,550,965 A | 8/1996 | Gabbe et al. |
| 5,606,369 A | 2/1997 | Keesman et al. |
| 5,719,786 A | 2/1998 | Nelson et al. |

(Continued)

FOREIGN PATENT DOCUMENTS

| | | |
|---|---|---|
| EP | 1168809 A2 | 1/2002 |
| EP | 2477401 A2 | 7/2012 |
| WO | 2006095293 A1 | 9/2006 |

OTHER PUBLICATIONS

Sangoli, S., "Video Previews for Interactive Videos Using a Markup Language," U.S. Appl. No. 16/885,101, filed May 27, 2020, 65 pages.

(Continued)

*Primary Examiner* — Jeremy L Stanley

(57) ABSTRACT

A device configured to receive a video request that includes source scene information for generating the plurality of video scenes for a Hypertext Markup Language (HTML) video. For each video scene, the device is configured to identify a video scene from the source scene information and to assign a video scene entry in a video timing map to the identified video scene. The device is further configured to identify animation instructions for animations associated with the identified video scene from the source scene information and to populate the video scene entry in the video timing map based on the animation instructions for the animations that are associated with the identified video scene. The device is further configured to output the video timing map.

14 Claims, 11 Drawing Sheets

(56) References Cited

U.S. PATENT DOCUMENTS

| | | | |
|---|---|---|---|
| 5,818,439 A | 10/1998 | Nagasaka et al. | |
| 5,884,056 A | 3/1999 | Steele | |
| 5,903,264 A * | 5/1999 | Moeller | H04N 21/47 |
| | | | 715/719 |
| 5,914,711 A | 6/1999 | Mangerson et al. | |
| 5,974,218 A | 10/1999 | Nagasaka et al. | |
| 5,996,023 A | 11/1999 | Winter et al. | |
| 6,061,399 A | 5/2000 | Lyons et al. | |
| 6,157,933 A * | 12/2000 | Celi, Jr. | G06F 16/957 |
| | | | 715/234 |
| 6,226,030 B1 | 5/2001 | Harvey et al. | |
| 6,313,835 B1 * | 11/2001 | Gever | G06F 16/958 |
| | | | 715/846 |
| 6,396,500 B1 * | 5/2002 | Qureshi | G06T 11/00 |
| | | | 345/473 |
| 6,570,585 B1 * | 5/2003 | Hines | H04N 21/23412 |
| | | | 345/473 |
| 6,961,384 B2 | 11/2005 | Nemiroff et al. | |
| 6,965,645 B2 | 11/2005 | Zhang et al. | |
| 7,110,027 B2 | 9/2006 | Wyman | |
| 7,593,015 B2 * | 9/2009 | Rao | G06F 16/9577 |
| | | | 345/473 |
| 7,612,832 B2 | 11/2009 | Zhang et al. | |
| 7,653,925 B2 * | 1/2010 | Hull | G11B 27/11 |
| | | | 725/37 |
| 7,797,633 B2 | 9/2010 | Flick et al. | |
| 8,164,596 B1 * | 4/2012 | Bech | G06T 13/00 |
| | | | 345/473 |
| 8,212,821 B1 * | 7/2012 | Kopylov | G06T 13/80 |
| | | | 345/473 |
| 8,214,861 B2 | 7/2012 | Kim et al. | |
| 8,438,484 B2 | 5/2013 | Gunatilake | |
| 8,732,579 B2 | 5/2014 | Rossmann et al. | |
| 8,875,008 B2 * | 10/2014 | Yuniardi | G06F 16/4393 |
| | | | 715/204 |
| 9,113,193 B1 | 8/2015 | Gardes et al. | |
| 9,244,600 B2 | 1/2016 | McIntosh et al. | |
| 10,162,487 B2 * | 12/2018 | Rajaraman | H04L 65/60 |
| 10,691,871 B2 * | 6/2020 | Lee | G06F 40/284 |
| 10,887,645 B2 * | 1/2021 | Stockhammer | H04N 21/4307 |
| 2001/0016007 A1 | 8/2001 | Wu et al. | |
| 2002/0044153 A1 * | 4/2002 | Hoch | H04N 5/222 |
| | | | 345/647 |
| 2002/0070952 A1 * | 6/2002 | Hoch | H04N 21/84 |
| | | | 345/647 |
| 2002/0147834 A1 | 10/2002 | Liou et al. | |
| 2002/0169926 A1 | 11/2002 | Pickney, III et al. | |
| 2003/0145338 A1 | 7/2003 | Harrington | |
| 2003/0167472 A1 | 9/2003 | Barbanson et al. | |
| 2004/0030994 A1 | 2/2004 | Hui et al. | |
| 2004/0095396 A1 | 5/2004 | Stavely et al. | |
| 2005/0039119 A1 * | 2/2005 | Parks | G06F 40/12 |
| | | | 715/209 |
| 2005/0076392 A1 | 4/2005 | Jung et al. | |
| 2005/0097471 A1 * | 5/2005 | Faraday | G06F 3/0486 |
| | | | 715/764 |
| 2005/0138143 A1 * | 6/2005 | Thompson | G06F 16/9574 |
| | | | 709/218 |
| 2005/0228849 A1 | 10/2005 | Zhang | |
| 2005/0231643 A1 | 10/2005 | Ross et al. | |
| 2006/0026524 A1 | 2/2006 | Ma et al. | |
| 2006/0036940 A1 * | 2/2006 | Hsiu-Ping | G06F 16/9577 |
| | | | 715/249 |
| 2006/0047722 A1 | 3/2006 | Walker et al. | |
| 2006/0067530 A1 | 3/2006 | Noguchi et al. | |
| 2007/0136750 A1 | 6/2007 | Abanami et al. | |
| 2007/0139418 A1 * | 6/2007 | Abel | G06T 13/20 |
| | | | 345/474 |
| 2007/0237225 A1 | 10/2007 | Luo et al. | |
| 2008/0005130 A1 * | 1/2008 | Logan | H04N 21/8456 |
| 2008/0139182 A1 | 6/2008 | Levy et al. | |
| 2008/0301579 A1 | 12/2008 | Jonasson et al. | |
| 2009/0122875 A1 | 5/2009 | Den Hollander | |
| 2009/0157407 A1 * | 6/2009 | Yamabe | G06F 40/30 |
| | | | 704/260 |
| 2010/0005406 A1 * | 1/2010 | Hathaway | G06F 3/0481 |
| | | | 715/764 |
| 2010/0064239 A1 * | 3/2010 | Crawford | G06F 16/44 |
| | | | 715/771 |
| 2010/0241962 A1 * | 9/2010 | Peterson | G11B 27/34 |
| | | | 715/720 |
| 2010/0293190 A1 | 11/2010 | Kaiser et al. | |
| 2013/0127875 A1 * | 5/2013 | Blas, Jr. | G06T 13/00 |
| | | | 345/473 |
| 2013/0163963 A1 | 6/2013 | Crosland et al. | |
| 2013/0271472 A1 * | 10/2013 | Duran | G06T 13/80 |
| | | | 345/473 |
| 2014/0013003 A1 * | 1/2014 | Giladi | H04L 65/604 |
| | | | 709/231 |
| 2014/0289654 A1 * | 9/2014 | Basapur | G06F 3/0481 |
| | | | 715/764 |
| 2015/0121198 A1 * | 4/2015 | Simonsen | G06F 16/9574 |
| | | | 715/236 |
| 2015/0227276 A1 * | 8/2015 | Batti | G06F 9/44526 |
| | | | 715/235 |
| 2015/0363505 A1 * | 12/2015 | Dewa | H04L 65/60 |
| | | | 715/234 |
| 2016/0048313 A1 * | 2/2016 | Weil | H04W 4/12 |
| | | | 715/723 |
| 2016/0226806 A1 * | 8/2016 | Weil | H04L 67/06 |
| 2017/0006257 A1 | 1/2017 | Staudenmaier et al. | |
| 2017/0193544 A1 * | 7/2017 | Glasgow | G06F 3/012 |
| 2018/0184178 A1 * | 6/2018 | Hoeben | H04N 21/2343 |
| 2019/0020915 A1 * | 1/2019 | Stockhammer | H04L 67/2804 |
| 2020/0222804 A1 * | 7/2020 | Cappello | G06T 13/40 |

OTHER PUBLICATIONS

Sangoli, S., "Real-Time Video Scene Modifications for Interactive Videos Using a Markup Language," U.S. Appl. No. 16/885,135, filed May 27, 2020, 62 pages.

* cited by examiner

FIG. 2

Source Scene 132

Source scene ID 134

```
Source scene ID
{
  metadata: {
    HTML: 'HTML string/DOM element/jQuery object',//HTML instructions    — HTML Instructions 202 animations: [{                          //animations instructions    — Animation Instructions 204
      e: '.element-selector'
      p: {left:'0%'},
      o: {duration: 1000}
    }]

audioSource : "",                       //audio source               — Audio Instructions 206 transitions: {                          //transition effect          — Transition Effect Instructions 208
      enter: {
        effect: 'slideLeft',
        duration: 500
      },
      exit: {
        effect: 'slideUp',
        duration: 500
      }
    }
  }
}
```

VIDEO BUFFERING FOR INTERACTIVE VIDEOS USING A MARKUP LANGUAGE

TECHNICAL FIELD

The present disclosure relates generally to creating interactive videos, and more specifically to video buffering for interactive videos using a markup language.

BACKGROUND

A web platform provides a computer network that enables users to access information from multiple sources. However, users typically have to visit multiple areas within the web platforms to gather what is meaningful to them. In existing systems, users do not have the capability to define their own personalized web content and access the web content without being redirected to multiple areas within the web platform. For example, a user may want to trade (e.g., buy or sell) a particular stock on a web platform. The user may go to a first place of the web platform to view statistics such as past performance of the stock, go to a second place of the web platform to check whether the user has enough account balance to trade the stock, and then go to a third place of the web platform to watch a video on how to conduct a trade on the stock. This process is not only inefficient, but it also poses several technical challenges. For example, this process constantly consumes network resources and bandwidth while user visits the multiple locations within the web platform. This process also consumes computing resources to process all the user's requests to visit the multiple locations in the web platform. In addition, this process also significantly increases the time it takes for the user to obtain the meaningful information which degrades the user's satisfaction with the web platform.

SUMMARY

A web platform provides a computer network that enables users to access information from multiple sources. However, users typically have to visit multiple areas within the web platforms to gather what is meaningful to them. In existing systems, users do not have the capability to define their own personalized web content and access the web content without being redirected to multiple areas within the web platform. For example, a user may want to trade (e.g., buy or sell) a particular stock on a web platform. The user may go to a first place of the web platform to view statistics such as past performance of the stock, go to a second place of the web platform to check whether the user has enough account balance to trade the stock, and then go to a third place of the web platform to watch a video on how to conduct a trade on the stock. This process is not only inefficient, but it also poses several technical challenges. For example, this process constantly consumes network resources and bandwidth while user visits the multiple locations within the web platform. This process also consumes computing resources to process all the user's requests to visit the multiple locations in the web platform. In addition, this process also significantly increases the time it takes for the user to obtain the meaningful information which degrades the user's satisfaction with the web platform.

The system disclosed herein provides several technical advantages which include creating an interactive video in the form of a series of HTML pages. Creating a video in the form of a series of HTML pages is an unconventional technique that allows a viewer to interact with HTML links or interactive HTML elements that are embedded in the HTML pages of the video. The interactive video includes interactive HTML elements that allow users to interact with the video. Allowing users to interact with the video facilitates increasing the efficiency of the disclosed system because the users do not need to go to different places (e.g., web pages) or be redirected to find the information they want. Instead, users can stay on and interact with the video to find the information they want. By doing this, users can avoid bouncing around multiple places and the system can avoid reloading or rebuffering the same web pages or content. This conserves network bandwidth and computing resources, such as memories and processing power.

Existing systems usually present a video in the format of MP4, MOV, AVI, among others. Rendering and streaming a video as a series of HTML pages requires less computing resources and network resources than rendering and streaming videos having other formats such as MP4, MOV, and AVI. This facilitates decreasing the loading and buffering time of the web content, reducing the response time of the disclosed system, and conserving computing resources and network resources.

Unlike traditional videos where a progress bar has a one-to-one correspondence between time and video frames, an interactive HTML videos may comprise animations, delays, and interactive HTML elements that have different timing characteristics. These elements have variable timing characteristics because these elements may occur sequentially, in parallel, or may even be optional. These variable timing characteristics mean that interactive HTML videos do not follow a linear timeline or have a one-to-one correspondence between time and video scenes. The disclosed system is configured to generate a progress bar for an interactive HTML video that provides a user interface that links video scenes and other elements in an interactive HTML video.

In one embodiment, the system includes a device that is configured to receive a video request that includes source scene information for generating video scenes for an HTML video. For each video scene, the device is configured to identify a video scene from the source scene information and to assign a video scene entry in a video timing map to the identified video scene. The device is further configured to identify animation instructions for animations that are associated with the video scene from the source scene information and to populate the video scene entry in the video timing map based on the animation instructions for the animations. The device is further configured to output the video timing map after populating the video timing map with information from the video request.

This process reduces the amount of time required to start playing an interactive video by segmenting the interactive video into segments that can be individually rendered and queued for display. For example, a video scene of an interactive video can be rendered and displayed to a user without having to wait for all of the video scenes of the interactive video to be rendered before playing the interactive video. This process also enables parallel processing to provide additional performance improvements for the underlying computing system. Since this process allows an interactive video to be broken down into multiple segments, the computing system can process multiple segments in parallel to further reduce the amount of time it takes to begin playing an interactive video.

In another embodiment, the system includes a device that is configured to display a first video scene and a progress bar for an HTML video and to receive a user input that indicates a time instance value on the progress bar. The device is further configured to identify a first source scene identifier for a second video scene and an animation identifier that is linked with the second video scene based on the time instance value. The device is further configured to identify HTML code that is associated with the first source scene identifier and the first animation identifier and to compile the identified HTML code to render the second video scene. The device is further configured to generate a scaled second video scene by reducing the size of the rendered second video scene to fit a preview frame and to display the scaled second video scene in the preview frame.

This process allows a user to preview a video scene from an interactive video without having to render all of the video scenes in the interactive video. For example, a user can hover a cursor of the progress bar of an interactive video to search for a particular part of the interactive video. This process is unlike the preview feature that is used for traditional videos. Traditional videos are composed of a large number of still images. Each video scene in a traditional video corresponds with one of the still images. In these types of videos, the preview feature simply displays a still image that is located at a particular time within the video. In contrast, to display a video scene from an interactive video, the HTML code that is associated with a video scene needs to be obtained and compiled to render the video scene. In addition, the video scenes in an interactive video are dynamic and their content may vary based on how a user interacts with the interactive video. This process provides the ability to dynamically obtain and compile the HTML code for rendering a video scene so that it can be provided as a preview for a user.

In another embodiment, the system includes a device that is configured to display a first video scene and a progress bar for an HTML video. The device is further configured to receive a user input that identifies an element in the first video scene that a user is interacting with. The device is further configured to determine the element is associated with modification instructions using a video timing map and to modify the HTML video based on the modification instructions. The device is further configured to update a total run time for the HTML video on the progress bar based on the modified second video scene.

Traditional videos are static and are composed of a large number of still images. These types of videos cannot be modified once the video has started playing. This means that the file size of a traditional video remains constant. In contrast, interactive videos are dynamic and their content can be modified even while the interactive video is playing. For example, an interactive video may be configured to add new video scenes, to remove video scenes, or to modify the content of a video scene while the interactive video is playing based on how a user interacts with the interactive video. This feature can improve the efficiency of the system when providing content to a user. For example, an interactive video may begin with a few video scenes and then may add additional video scenes as necessary to the interactive video based on the user's interaction with the interactive video. In this example, the underlying system can launch an interactive video using a reduced file size and then can later increase the file size of the interactive video as necessary. As another example, the file size of an interactive video can be reduced by removing video scenes while the interactive video is playing based on the user's interaction with the interactive video. This feature results in improved memory utilization and improved network bandwidth utilization.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 2 is an embodiment of a source scene for an interactive video;

DETAILED DESCRIPTION

The system disclosed herein provides several technical advantages which include creating an interactive video in the form of a series of HTML pages. Creating a video in the form of a series of HTML pages is an unconventional technique that allows a viewer to interact with HTML links or interactive HTML elements that are embedded in the HTML pages of the video. Existing systems and methods usually present a video in the format of MP4, MOV, AVI, among others. Rendering and streaming a video as a series of HTML pages requires less computing resources and network resources than rendering and streaming videos having other formats such as MP4, MOV, and AVI. This facilitates decreasing the loading and buffering time of the web content, reducing the response time of the disclosed system 100, and conserving computing resources and network resources.

Unlike traditional videos where a progress bar has a one-to-one correspondence between time and video frames, an interactive HTML videos may comprise animations 164, delays, and interactive HTML elements that have different timing characteristics. These elements have variable timing characteristics because these elements may occur sequentially, in parallel, or may even be optional. These variable timing characteristics mean that interactive HTML videos do not follow a linear timeline or have a one-to-one correspondence between time and video scenes. The disclosed system is configured to generate a progress bar for an interactive HTML video. The progress bar provides a user interface that links video scenes and other elements in an interactive HTML video.

Figure 1:
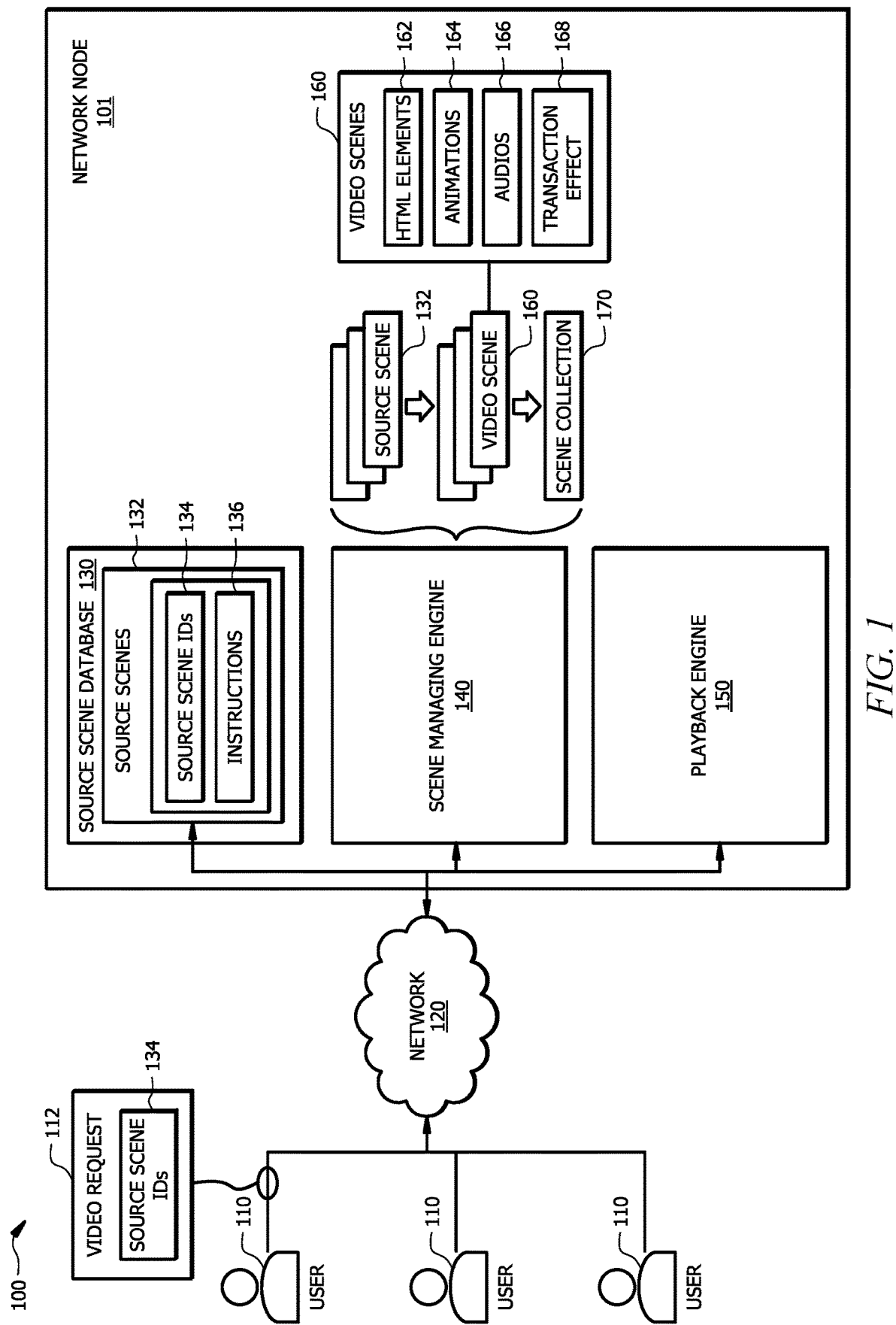
FIG. 1 is a schematic diagram of an embodiment of a system for creating an interactive video using a markup language according to the present disclosure.
Figure 3:
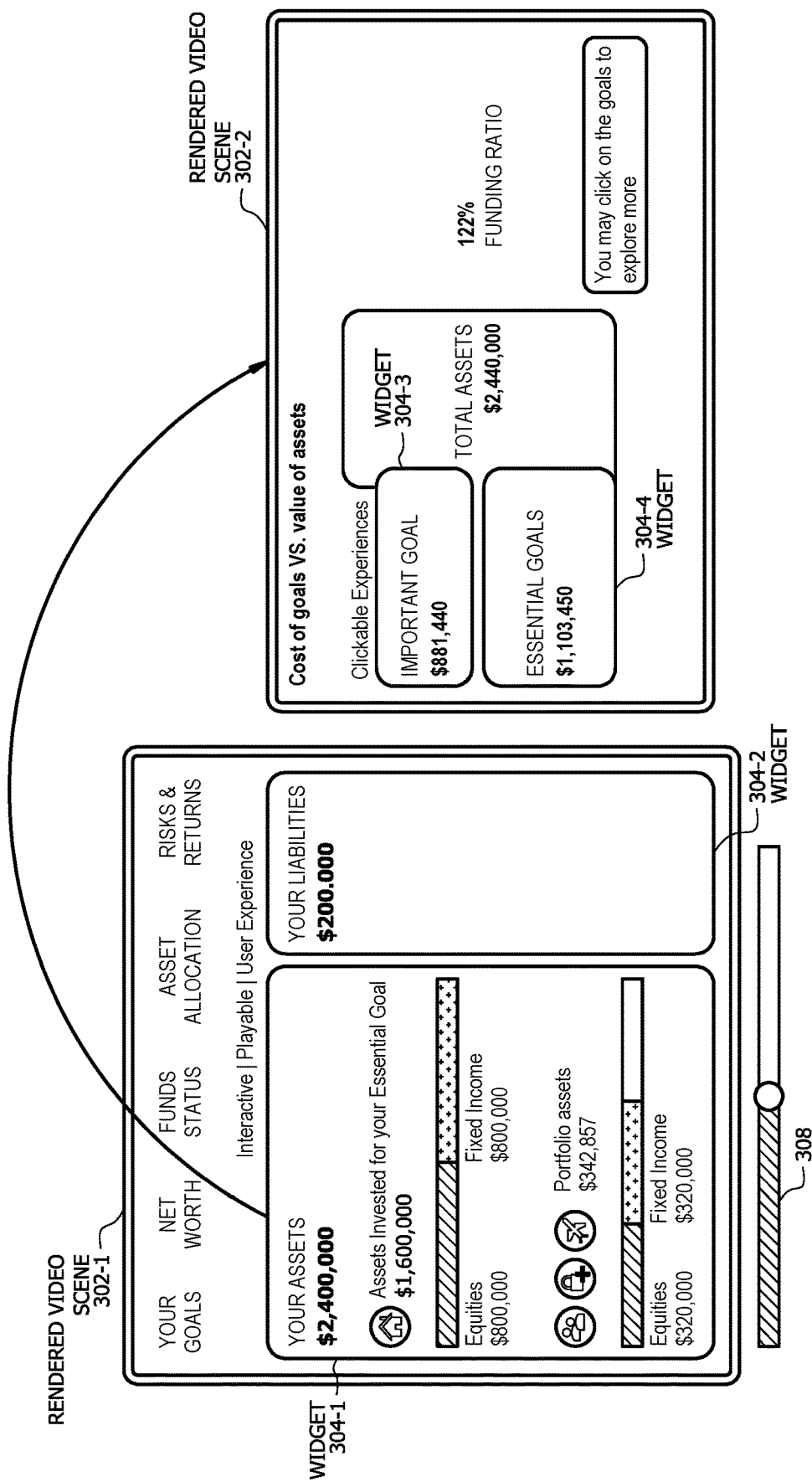
FIG. 3 is an embodiment of a rendered video scene of an interactive video.
Figure 4:
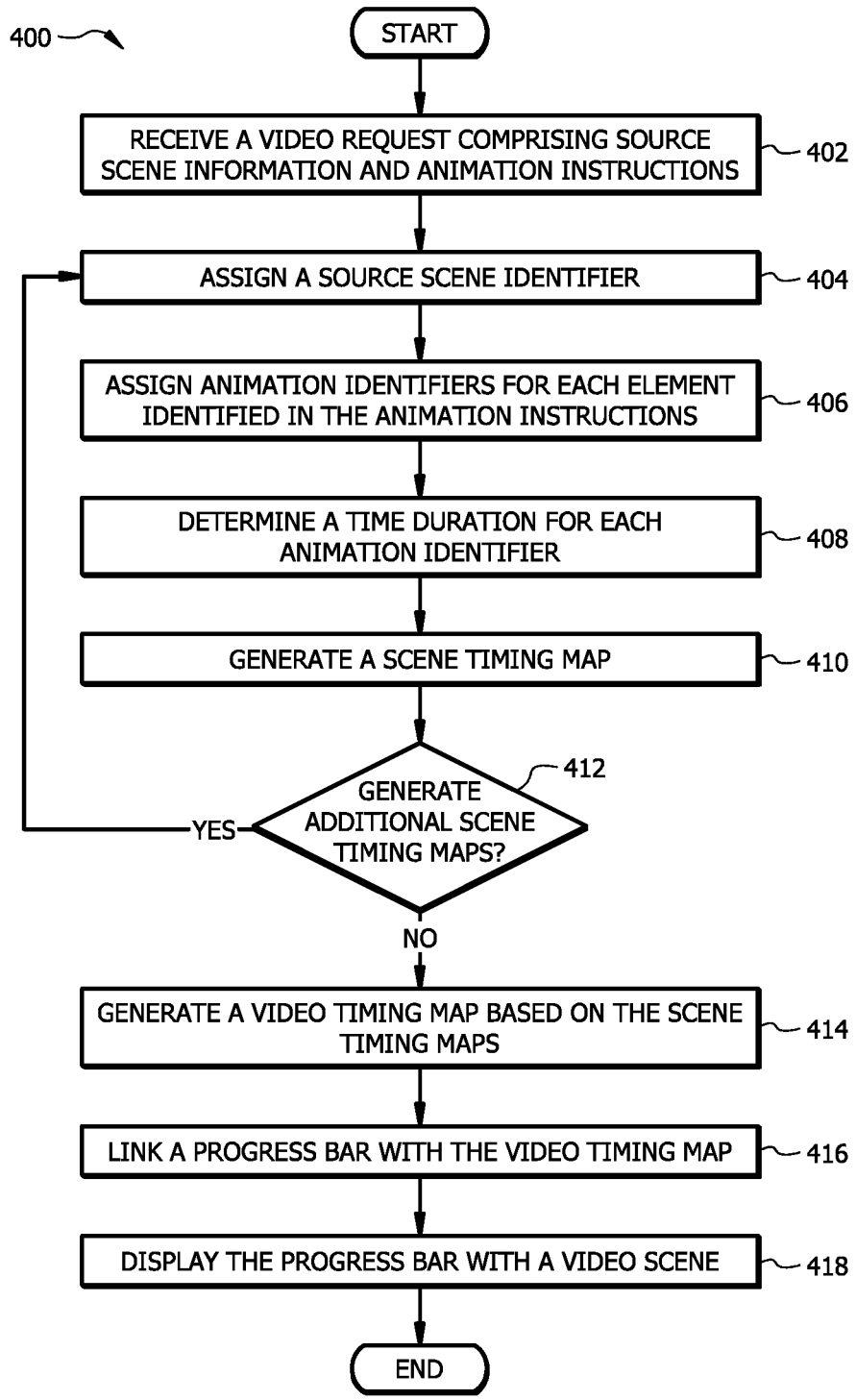
FIG. 4 is a flowchart of an embodiment of a progress bar generating method for an interactive video.
Figure 5:
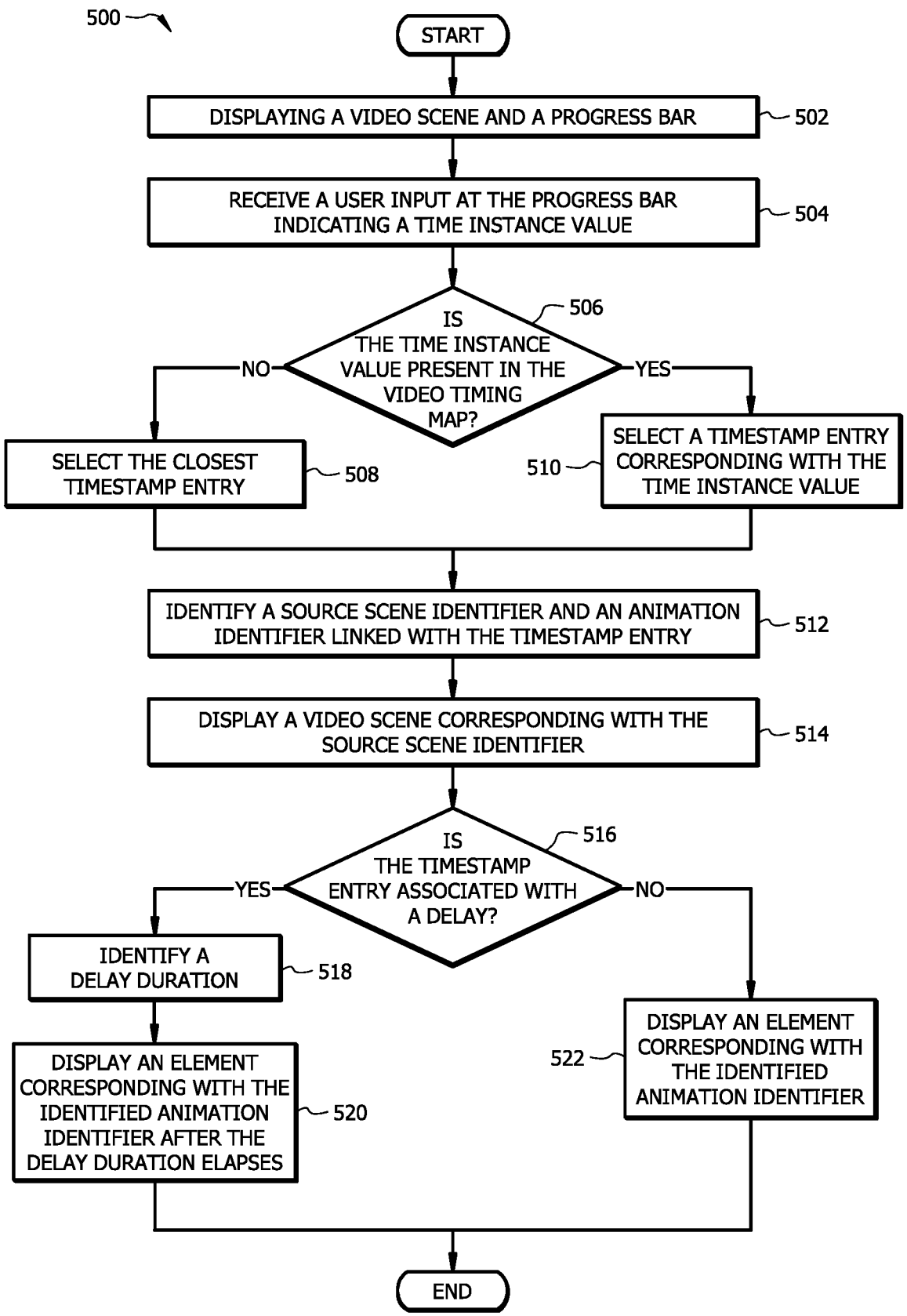
FIG. 5 is a flowchart of an embodiment of an interactive video synchronization method for an interactive video.

FIG. 1 is an example of an interactive video system configuration to generate interactive HTML videos. FIG. 2 is an example of a scene source for an interactive HTML video. FIG. 3 is an example of a rendering of a portion of an interactive HTML video. FIG. 4 is an example of a process for linking animations in an interactive HTML video with a progress bar. FIG. 5 is an example of a process for using a progress bar that is linked with animations in an interactive HTML video.

Figure 6:
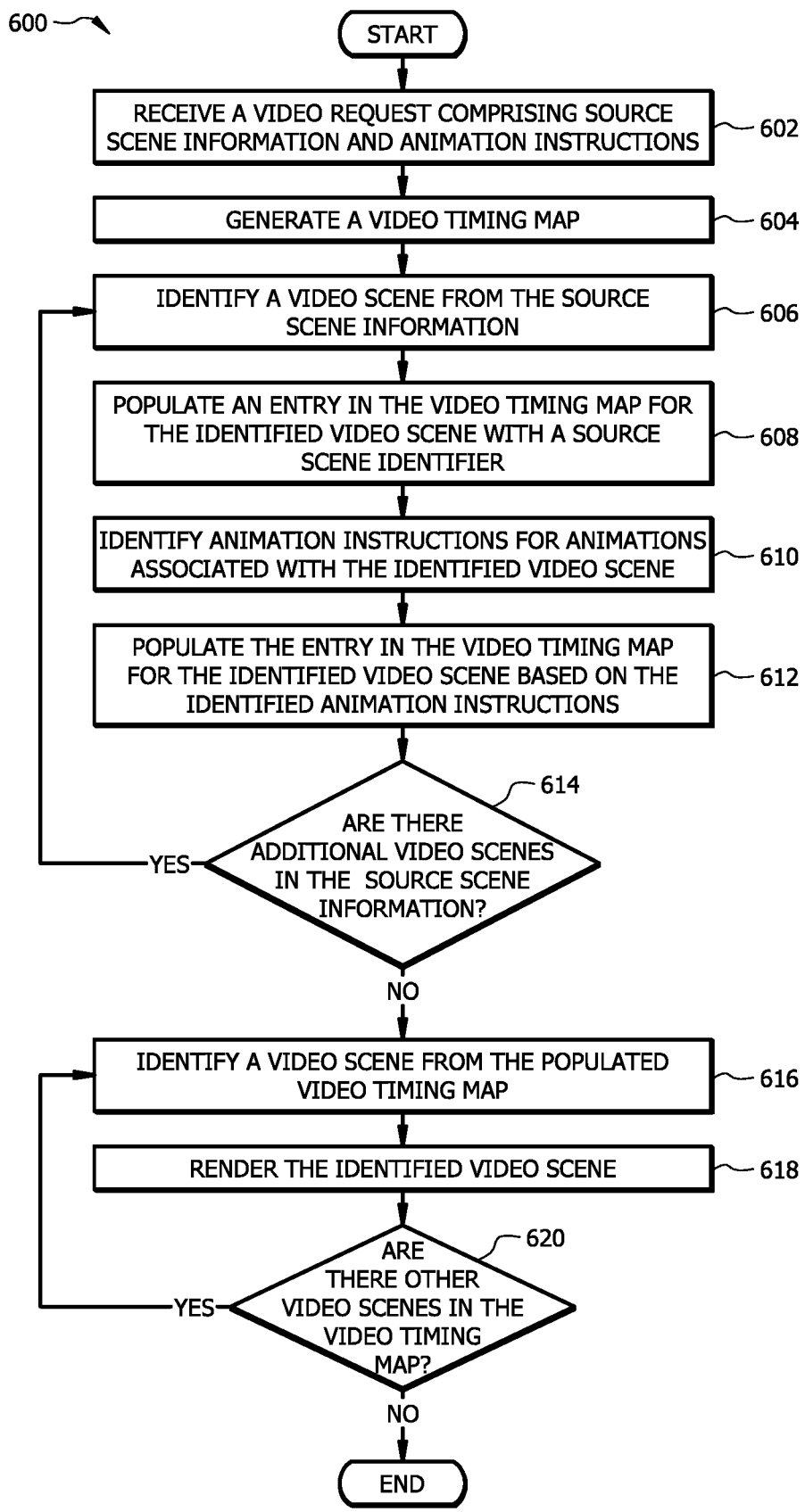
FIG. 6 is a flowchart of an embodiment of a video buffering method for an interactive video.
Figure 7:
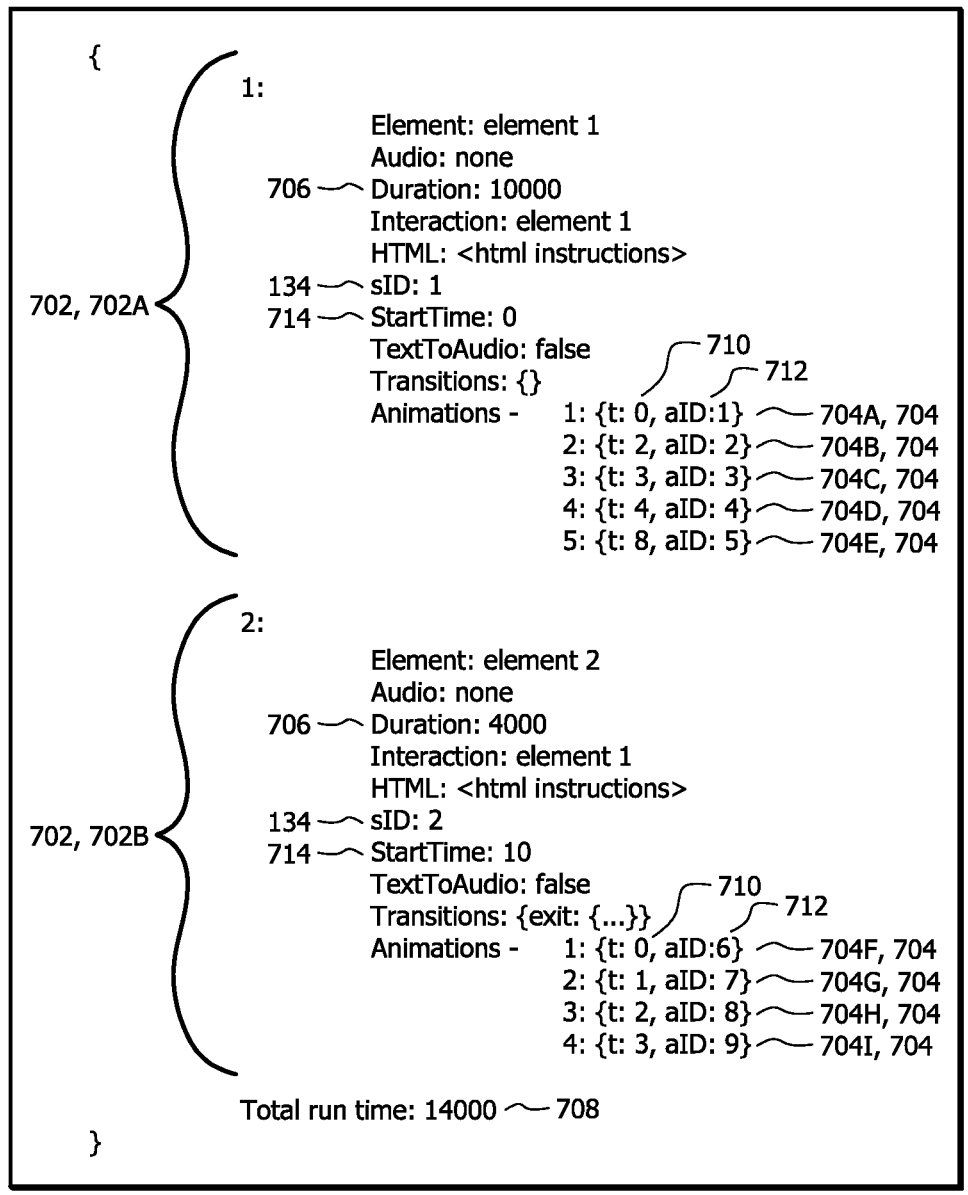
FIG. 7 is an example of a video timing map for an interactive video.
Figure 8:
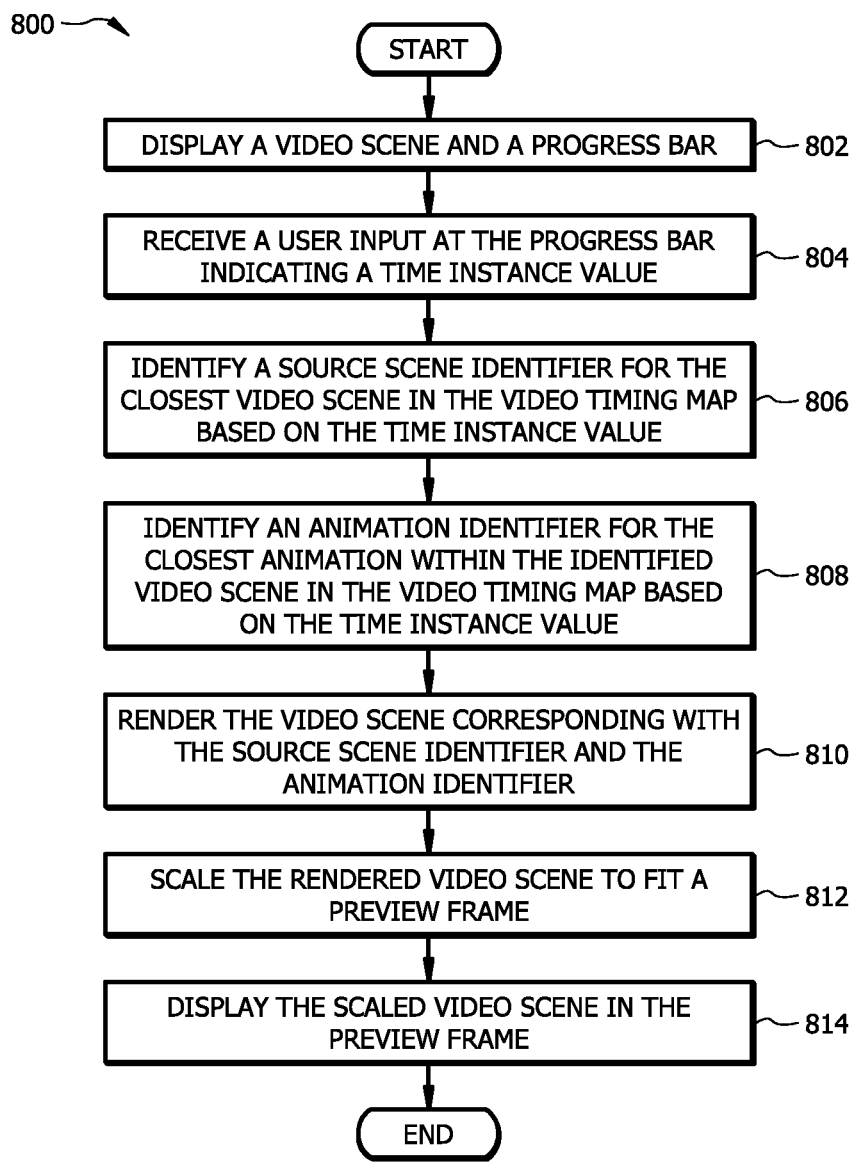
FIG. 8 is a flowchart of an embodiment of a video previewing method for an interactive video.
Figure 9:
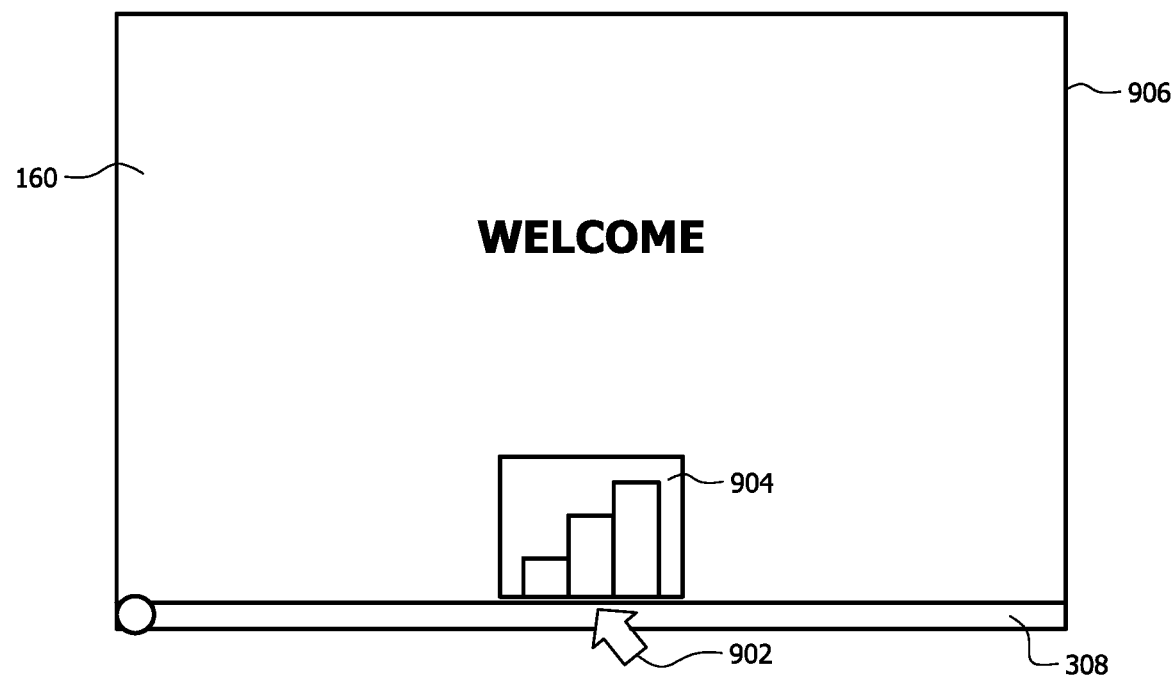
FIG. 9 is an example of an interactive video with a preview frame.
Figure 10:
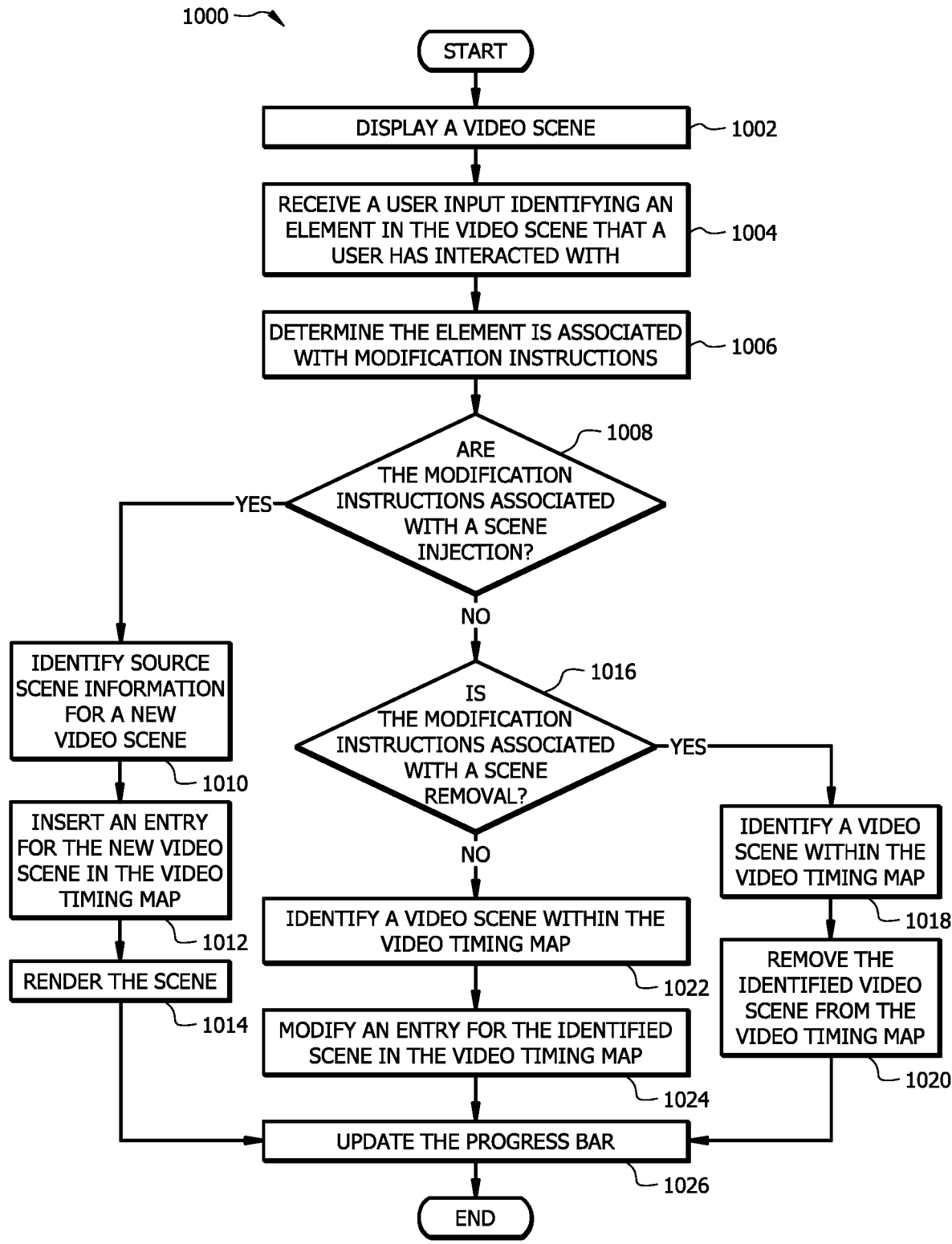
FIG. 10 is a flowchart of a video modification method for an interactive video.
Figures 11, 12:
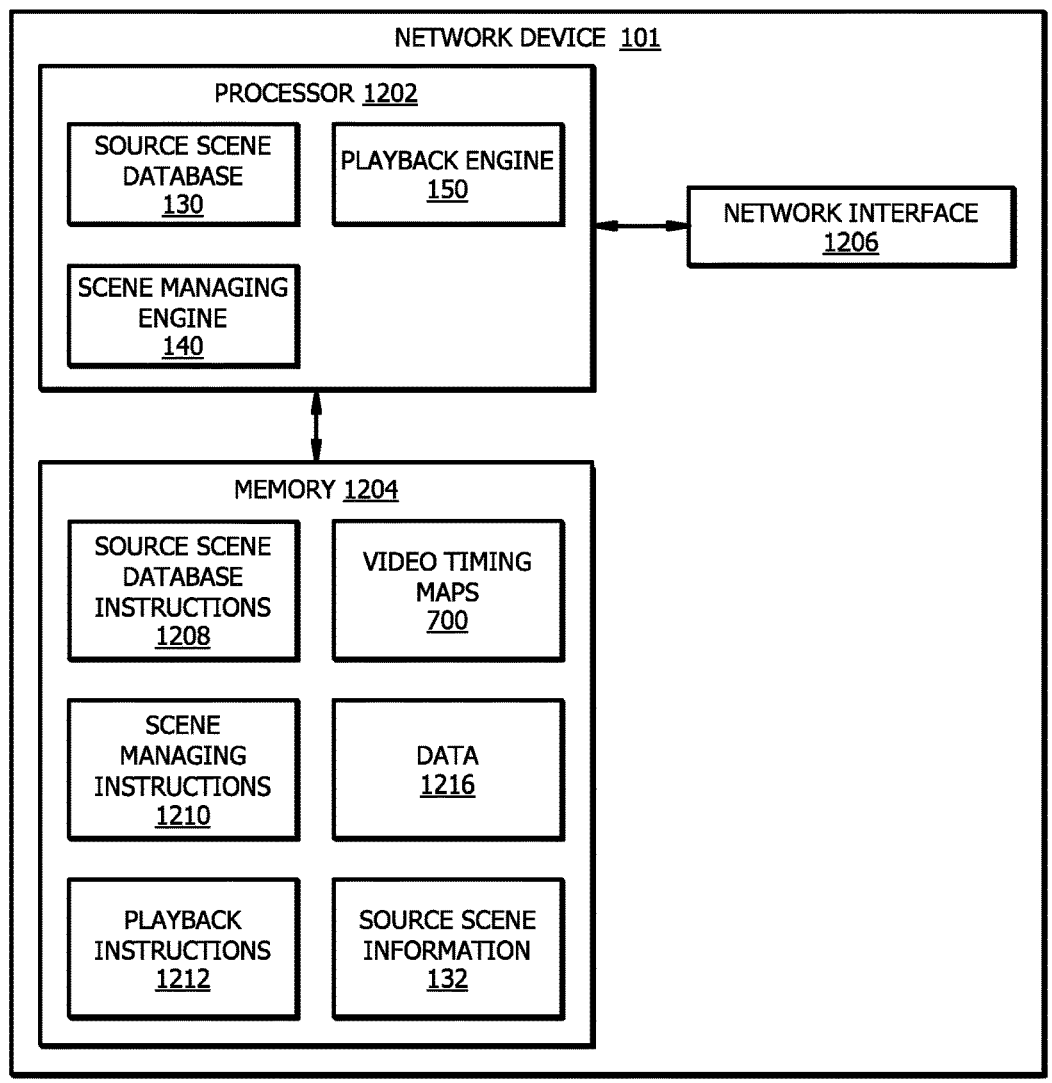
FIG. 11 is an example of modification instructions for an interactive video.
FIG. 12 is a schematic diagram of an embodiment of a network device configured to create an interactive video using a markup language.

FIG. 6 is an example of a process for implementing interactive HTML video buffering. FIG. 7 is an example of a video timing map that enables interactive HTML video buffering. FIG. 8 is an example of a process for generating video previews for an interactive HTML video. FIG. 9 is an example of displaying a video preview for an interactive HTML video. FIG. 10 is an example of a process for modifying a video timing map. FIG. 11 is an example of modification instructions for modifying an interactive HTML video. FIG. 12 is an example of a network node configured to generate an interactive HTML video.

System Overview

FIG. 1 is a schematic diagram of an embodiment of an interactive video system for creating interactive videos using a markup language according to the present disclosure. The system 100 comprises one or more network devices 101 in signal communication with one or more users 110 via a network 120. For example, a user 110 may employ a computer or mobile device (e.g. a smartphone) to communicate with the network node 101 using a network connection. The system 100 is generally configured to receive a video request 112 from a user 110, to retrieve a set of source scenes 132 from a source scene database 130, to generate video scenes 160 in the form of Hypertext Markup Language (HTML) pages using a scene managing engine 140, to include the video scenes 160 in a scene collection 170, and to process the scene collection 170 using a playback engine 150.

The network 120 is any suitable type of network operable to support communication between users and components (e.g. network nodes 101) of the system 100. The network 120 is configured to enable wired and/or wireless communications. For example, the network 120 may include all or a portion of the Internet, a public switched telephone network (PSTN), a public network, a private network, a local area network (LAN), a metropolitan area network (MAN), a wide area network (WAN), or any other suitable type of network. The network 120 may be configured to support any suitable type of communication protocol as would be appreciated by one of ordinary skill in the art upon viewing this disclosure.

The network node 101 comprises a source scene database 130, a scene managing engine 140, and a playback engine 150. In FIG. 1, the source scene database 130, the scene managing engine 140, and the playback engine 150 are shown as being implemented in a single network device 101. In other examples, the source scene database 130, the scene managing engine 140, and the playback engine 150 may be implemented by any suitable number of network nodes 101. Additional information about the network node 101 is described in FIG. 12.

Source Scene Database

The source scene database 130 is configured to store and maintain source scene 132 information. The source scene database 130 may be implemented by one or more processors or data storage devices (e.g., disks, solid-state drives). In FIG. 1, the source scene database 130 is shown as located within the network device 101. In some embodiments, the source scene database 130 may be a data storage device that is external to the network device 101. For example, the source scene database 130 may be a data storage device that is in signal communication with the network node 101.

Source scenes 132 include source code for the web content requested by users 110. For example, source scenes 132 may include source code for generating relevant web content such as, for example, stock information, account balance information for users 110, and instructions on how to conduct a trade, among others. In some embodiments, each source scene 132 includes a source scene identifier (ID) 134 and a set of instructions 136 comprising HTML instructions and animation instructions related to the web content. For example, referring to FIG. 2, a source scene 132 includes source scene ID 134, HTML instructions 202, and animation instructions 204. In some embodiments, the instructions 136 in the source scenes 132 are written in a format of JavaScript Object Notation (JSON). In alternative embodiments, the instructions 136 in the source scenes 132 may be written in any other suitable language or format. The HTML instructions 202 in the source scenes 132 are used to generate HTML code for the web content associated with the source scenes 132. For example, the HTML instructions may include instructions 136 identifying the number and/or types of HTML elements that will be included in the generated HTML code. An HTML element may have a format of HTML string, a Document Object Model (DOM) element, j Query object, or any other suitable format. The animation instructions 204 in the source scenes 132 are used to generate animations for the web content associated with the source scenes 132. For example, the animation instructions 204 may include instructions 136 identifying the number and/or types of animations that will be generated. In some embodiments, a source scene 132 further includes other instructions. For example, referring to FIG. 2, a source scene 132 may further include audio instructions 206 and/or transition effect instructions 208.

Scene Managing Engine

The scene managing engine 140 is configured to manage source scenes 132. The scene managing engine 140 comprises tools and libraries to support processing the source scenes 132. For example, scene managing engine 140 may be configured to retrieve source scenes 132 from source scene database 130 and to generate a video scene 160 for each of the retrieved source scenes 132 as described in greater detail below.

The scene managing engine 140 is configured to retrieve source scenes 132 from the source scene database 130. For example, the scene managing engine 140 receives a video request 112 from a user 110 which may include a set of source scene IDs 134 arranged in a pre-determined ordering specified by the user 110. For instance, the user 110 may want to generate a video for trading (e.g. sell or buy) a particular stock using the system 100. In this example, the user 110 may want to view past performance of the stock, check whether the user 110 has enough account balance to trade the stock, and watch a video on how to conduct a trade on the stock. The system 100 may provide the user 110 with the capabilities to select sources scenes 132 related to such information. For example, the user 110 may specify, in the video request 112, a first source scene ID 134 associated with a first source scene 132 about statistics of stocks, a second source scene ID 134 associated with a second source scene 132 about account balances of the user 110, and a third source scene ID 134 associated with a third source scene 132 about instructions on conducting a trade. The three source scene IDs 134 in the video request 112 may be arranged in a pre-determined ordering, such as in the order of the first source scene ID 134, the second source scene ID 134, and the third source scene ID 134. The scene managing engine 140 is configured to read the source scene IDs 134 in the video request 112 and to retrieve source scenes 132 associated with the source scene IDs 134 from the source scene database 130. The scene managing engine 140 identifies the source scenes 132 based on the source scene IDs 134 and retrieves the identified source scenes 132.

The scene managing engine 140 is further configured to generate video scenes 160 from the source scenes 132. The scene managing engine 140 generates a video scene 160 in the form of a web page written in a markup language. For example, the scene managing engine 140 may generate a video scene 160 in the form of an HTML page. In some embodiments, video scene 160 includes one or more interactive HTML elements 162, one or more animations 164, one or more audios 166, and one or more transition effects 168. The one or more interactive HTML elements 162 may have a format of an HTML string, a DOM element, a jQuery object, or any other suitable format. The animations 164 may have a format of JavaScript, an HMTL object, or any other suitable format. In some embodiments, the scene managing engine 140 generates the video scenes 160 from the source scenes 132 based on the instructions 136 in the sources scenes 132. For example, generation module 146 may use the HTML instructions 202 in the source scenes 132 to generate HTML code including the interactive HTML elements 162 and use the animation instructions 204 in the source scenes 132 to generate one or more animations 164 associated with the HTML code. In some embodiments, the animations 164 written in JavaScript are embedded in the HTML code generated from the HTML instructions 202. The scene managing engine 140 may be further configured to use the audio instructions 206 and transition effect instructions to generate audios 166 and transition effect 168 and insert them in the HTML code.

In some embodiments, one or more interactive HTML elements 162 are implemented as one or more widgets that allow users 110 to interactively view the information in the video scenes 160. For example, a first video scene 160 may include a first HTML element 162 implemented as a first widget, which provides a drill-down capability such as a dropdown menu showing a list of stocks. Each stock in the dropdown menu, when clicked by the user 110, may show statistics such as the historical performance of the stock. As another example, a second video scene 160 may include a second HTML element 162 implemented as a second widget, which provides a drill-down capability such as a dropdown menu showing a list of accounts owned by the user 110, such as a retirement account, a checking account, and an investment account, among others. Each account in the dropdown menu, when clicked by the user 110, may show account balance of the account. As another example, a third video scene 160 may include a third HTML element 162 implemented as a third widget, which provides a drill-down capability such as a dropdown menu showing a list of videos on instructions on conducting a trade on stocks, equities, bonds, and mutual funds, among others. In this example, each video in the dropdown menu, when clicked by the user 110, may play a video on instructions on conducting a particular trade.

The video scenes 160 include interactive HTML elements 162 that allow users to interact with the video scenes 160. Allowing users 110 to interact with video scenes 160 increases the efficiency of the system 100 because the users 110 do not need to be redirected to different places (e.g., web pages) and bounce around to find and use the information they want. Instead, users 110 can stay on and interact with the video scenes 160 to find the information they want. By doing this, users 110 can avoid being redirected to multiple places and the system 100 can avoid reloading or rebuffering the same web pages or content. This reduces the response time of the system 100 and conserves computing resources, memories, and other network resources.

After generating video scenes 160 for all the source scenes 132, the scene managing engine 140 comprises the video scenes 160 into a scene collection 170. The video scenes 160 in the scene collection 170 are arranged in an ordering corresponding to the pre-determined ordering of the source scene IDs 134 specified in the video request 112. The scene managing engine 140 forwards the generated scene collection 170 to playback engine 150 for subsequent processing.

Playback Engine

Playback engine 150 is configured to process video scenes 160 in a scene collection 170. Playback engine 150 comprises tools and libraries to support creating an interactive video based on the video scenes 160 in the scene collection 170. The playback engine 150 is generally configured to receive a scene collection 170, to process the video scenes 160 in the scene collection 170, and to create an interactive video based on the video scenes 160.

In one embodiment, the playback engine 150 is configured to receive the scene collection 170 from the scene managing engine 140 and to process the video scenes 160 in the scene collection 170. For example, the playback engine 150 may map the video scenes 160 to a timeline. Specifically, the playback engine 150 may assign an animation ID to each of the animations 164 associated with each of the video scenes 160. In some embodiments, each animation 164 may include one or more frames. The playback engine 150 may further assign an animation ID to each of the frames in each of the animations 164. Then, the playback engine 150 maps the animation IDs to a pre-determined timeline. For example, the playback engine 150 may associate each animation ID with a timestamp in the pre-determined timeline. In some embodiments, the pre-determined timeline is determined based on the pre-determined ordering of source scene IDs in the video request 112.

The playback engine 150 is further configured to render the video scenes 160 in the received scene collection 170. The playback engine 150 comprises tools and libraries to support parsing a markup language (e.g., HTML), analyzing elements in the markup language, and creating a formalized layout of the elements. For example, the playback engine 150 may be configured to parse the video scenes 160 in the form of an HTML page, to analyze the interactive HTML elements 162 in the HTML page, and to create a layout of the HTML page including some widgets implemented by the interactive HTML elements 162. For example, referring to FIG. 3, a first video scene 160 is rendered as a first rendered video scene 302-1 configured with two widgets 304, namely a first widget 304-1 and a second widget 304-2. The first widget 304-1 may be implementing a first interactive HTML element 162 of the first video scene 160, and the second widget 304-2 may be implementing a second interactive HTML element 162 of the video scene 160. As illustrated, the first widget 304-1 is configured to show assets of user 110 and the second widget 304-2 is configured to show liabilities of the user 110. When viewing a video including the rendered video scene 302-1, a user 110 can pause the interactive video at the video scene 302-1 and interact with any one of the two widgets 304. For example, the user 110 may click on an HTML link or an interactive HTML element in the widgets 304. The HTML link or the interactive HTML element in the widgets 304, when clicked or pressed, may present one or more web content items or performs one or more predetermined drill-down tasks. The two widgets 304 of rendered video scene 302-1 provide users 110 with drill-down capabilities to view additional information. For example, when the user 110 clicks on the first widget 304-1 showing assets of the user 110, the system 100 may display another rendered video scene 302-2 including another two widgets 304-3 and 304-4 that shows "important goal" and "essential goal" for the user 110, respectively. The two widgets 304-3 and 304-4 may further have drill-down capabilities that allow user 110 to click on the widgets 304 and explore additional information.

The playback engine 150 may be further configured to render the animations 164 associated with a video scene 160. The rendering engine 152 creates an interactive video by including the animations 164 in the rendered video scenes 160. The playback engine 150 is configured to playback the video generated based on the rendered scene collection 170. Playback engine 150 may be configured to map the timeline of the frames and/or the animations 164 to a progress bar 308 and to play the video for the user 110. An example of mapping animations 164 to a progress bar 308 is described in FIG. 4. An example of using the disclosed progress bar 308 is described in FIG. 5. The playback engine 150 plays the video in the form of a series of HTML pages while allowing users 110 to pause and interact with the interactive HTML elements 162 implemented as widgets 304 in the video. In this way, the system 100 provides users 110 with an interactive video experience with drill-down capabilities, which supports customization and personalization for individual users 110.

Video Generating Process

The following is a non-limiting example of the system 100 in operation. The system 100 receives a video request 112 from a user 110. Specifically, the scene managing engine 140 receives the video request 112 that comprises a set of source scene IDs 134. The source scene IDs 134 in the video request 112 are arranged in a pre-determined order specified by the user 110. Then, the scene managing engine 140 uses the source scene IDs 134 to retrieve the source scenes 132 corresponding to the source scene IDs 134 from the source scene database 130. Next, the scene managing engine 140 receives the source scenes 132 and generates a video scene 160 for each of the received source scenes 132. For example, the scene managing engine 140 may generate a video scene 160 in the form of an HTML page for each source scene 132. In some embodiments, the scene managing engine 140 generates the video scenes 160 from the source scenes 132 based on the instructions 136 in the source scenes 132. For example, the scene managing engine 140 may use the HTML instructions 202 in the source scenes 132 to generate HTML code including one or more interactive HTML elements 162 and use the animation instructions 204 in the source scenes 132 to generate one or more animations 164 associated with the HTML code.

After generating video scenes 160 for each of the source scenes 132, the scene managing engine 140 includes the video scenes 160 in a scene collection 170. The video scenes 160 in the scene collection 170 are arranged in an ordering corresponding to the pre-determined ordering of the source scene IDs 134 specified in the video request 112. The scene managing engine 140 forwards the generated scene collection 170 to playback engine 150 for subsequent processing.

The playback engine 150 receives the scene collection 170 from the scene managing engine 140 and processes the video scenes 160 in the scene collection 170.

For example, the playback engine 150 may map the video scenes 160 to a timeline. Specifically, the playback engine 150 may assign an animation ID to each of the animations 164 associated with each of the video scenes 160. In some embodiments, each animation 164 may include one or more frames. The playback engine 150 may further assign an animation ID to each of the frames in each of the animations 164. Then, the playback engine 150 maps the animation IDs to a pre-determined timeline. For example, the playback engine 150 may associate each animation ID with a timestamp in the pre-determined timeline. In some embodiments, the pre-determined timeline is determined based on the pre-determined ordering of source scene IDs in the video request 112.

Next, the playback engine 150 parses the video scenes 160 in the form of an HTML page, analyzes the interactive HTML elements in the HTML page, and creates a layout of the HTML page including some widgets implemented by the interactive HTML elements. The playback engine 150 renders the animations 164 associated with the video scenes 160. In some embodiments, the playback engine 150 creates an interactive video by including the animations 164 in the rendered video scenes 302.

The playback engine 150 maps the timeline of the frames and/or the animations 164 of the rendered videos scenes 302 to a progress bar 308 and plays the video for the user 110. An example of a process for mapping video scenes 160 to a progress bar 308 is described in FIG. 4. The playback engine 150 may play the video while allowing users 110 to pause and interact with the interactive HTML elements in each video scene 160 in the interactive video. In some embodiments, the interactive HTML elements are implemented as widgets 304 that allow users 110 to interactively view the information in the video scenes 160.

Progress Bar Generating Process

FIG. 4 is a flowchart of an embodiment of a progress bar generating method 400 for an interactive video. Unlike traditional videos where a progress bar has a one-to-one correspondence between time and video frames, an interactive HTML videos may comprise animations 164, delays, and interactive HTML elements that have different timing characteristics. These elements have variable timing characteristics because these elements may occur sequentially, in parallel, or may even be optional. These variable timing characteristics mean that interactive HTML videos do not follow a linear timeline or have a one-to-one correspondence between time and video scenes. The playback engine 150 may employ method 400 to generate progress bar 308 for an interactive HTML video. The progress bar 308 provides a user interface that links video scenes 160 and other elements in an interactive HTML video.

At step 402, the playback engine 150 receives a video request 112 comprising source scene information for a set of video scenes 160 (e.g. a scene collection 170) and animation instructions 204. An example of a video request 112 is shown below in Table 1. The animation instructions 204 comprise a set of elements (e.g. animations 164, delays, and interactive HTML elements) and time durations linked with each element in the set of the elements. Referring to Table 1 as an example, the video request 112 comprises information for two video scenes 160. The first scene comprises three elements (shown as "elem1," "elem2," and "elem3"). The first element is linked with a time duration of 1000 milliseconds (ms). The time duration indicates how long the element takes to finish execution. The second element is linked with a time duration of 2000 ms and a delay of 1000 ms. The delay indicates the length of time for a waiting period before executing an element. The third element is linked with a time duration of 3000 ms. In this example, the time durations and delays are in units of milliseconds. In other examples, the time durations and delays may be in any other suitable units. Similarly, the second video scene 160 comprises three elements (shown as "elem4," "elem5," and "elem6"). The animation instructions 204 may further comprise properties or any other suitable type of information related to the elements. In some embodiments, the animation instructions 204 may comprise audio instructions 206 and/or transition effect instructions 208.

identifying the elements. An example of using animation IDs is shown below in Table 2.

At step 408, the playback engine 150 determines a time duration for each animation ID. Referring to Table 1, the playback engine 150 may use the time durations linked with an element as the time duration for the corresponding animation ID. For example, the playback engine 150 may determine that the time duration for the animation ID linked with the first element "elem1" is 1000 ms, the time duration for the animation ID linked with the second element "elem2" is 2000 ms, the time duration for the animation ID linked with the delay for the second element is 1000 ms, and so on.

In some embodiment, the animation instructions 204 may indicate that one or more of elements are configured to run in parallel. For example, the animation instructions 204 may comprise a flag that indicates when elements are configured to run in parallel. In this example, the playback engine 150 may determine which element has the largest time duration and may use this time duration as the time duration for the animation ID linked with the elements running in parallel. For instance, the playback engine 150 may determine that a

TABLE 1

Example of a video request

```
{
    "metadata": {
        "html": "html",
        "animations": [
            { "e": ".elem1", "p": { "left": "10%"}, "o": {"duration": 1000}},
            { "e": ".elem2", "p": { "scale": 2 }, "o": {"duration": 2000, "delay" : 1000}},
            { "e": ".elem3", "p": { "left": "0%"}, "o": {"duration": 3000}},
        ]
    }
},
{
    "metadata": {
        "html": "html",
        "animations": [
            { "e": ".elem4", "p": { "left": "10%"}, "o": {"duration": 1000}},
            { "e": ".elem5", "p": { "scale": 2 }, "o": {"duration": 2000}},
            { "e": ".elem6", "p": { "left": "0%"}, "o": {duration": 3000, "delay" : 500}},
        ]
    }
}
```

At step 404, the playback engine 150 assign or determines a source scene ID 134 for a video scene 160. Here, the playback engine 150 assigns source scene IDs 134 that uniquely identify each video scene 160 in the set of video scenes 160. For example, the playback engine 150 may associate the first video scene 160 with a source scene ID 134 of "sId1" and the second video scene 160 with a source scene ID 134 of "sId2." In other examples, the playback engine 150 may use any suitable type of identifier for identifying the video scenes 160 in the set of video scenes 160.

At step 406, the playback engine 150 assigns animation IDs for each element identified in the animation instructions. Here, the playback engine 150 assigns animation IDs that identify one or more elements. Referring to Table 1, the playback engine 150 may assign the first element "elem1" with an animation ID of one. The playback engine 150 may also assign animation IDs to delays that are associated with an element. For example, the playback engine 150 may assign an animation ID to the delay that is linked with the second element "elem2." In other examples, the playback engine 150 may use any suitable type of identifier for first element and a second element are configured to run in parallel in response to identifying a flag in the animation instructions 204. The first element is linked with a time delay of 1000 ms and the second element is linked with a time duration of 2000 ms. In this example, the playback engine 150 will use the time duration of 2000 ms for the animation ID linked with the first element and the second element running in parallel. This process takes into account that the first element and the second element are running in parallel and not sequentially.

At step 410, the playback engine 150 generates a scene timing map. An example of a scene timing map is shown below in Table 2. The scene timing map is configured to link source scene IDs 134 with animation ID and their corresponding time durations. Referring to Table 2 as an example, the playback engine 150 links the source scene ID 134 for the first video scene 160 with the animation IDs for the first element, the second element, the third element, and their delays. In this example, an animation ID with a value of one is linked with the first element "elem1." An animation ID with a value of two is linked with a first portion of the delay associated with the second element "elem2" and an animation ID with a value of three is linked with a second portion of the delay associated with the second element "elem2." An animation ID with a value of four is linked with the second element "elem2." An animation ID with a value of five is linked with the third element "elem3." Each animation ID is linked with its corresponding time duration that was determined in step 408. The process of linking source scene IDs 134 with animation IDs and their corresponding time durations is repeated for every video scene 160. The scene timing map may further comprise a start time value associated with each video scene 160 or any other information.

TABLE 2

Example of a scene timing map

```
{
    "sId": 1,
    "startTime": 0,
    "animations": [
        { "aId": 1, "e": ".elem1", "p": { "left": "10%"}, "o": {"duration": 1000}},
        { "aId": 2, "da": 1, "o": {"duration": 500}},
        { "aId": 3, "da": 1, "o": {"duration": 500}},
        { "aId": 4, "e": ".elem2", "p": { "scale": 2 }, "o": {"duration": 2000, "delay" : 1000}},
        { "aId": 5, "e": ".elem3", "p": { "left": "0%"}, "o": {"duration": 3000}},
    ]
},
{
    "sId": 2,
    "startTime": 7000,
    "animations": [
        { "aId": 6, "e": ".elem4", "p": { "left": "10%"}, "o": {"duration": 1000}},
        { "aId": 7, "e": ".elem5", "p": { "scale": 2 }, "o": {"duration": 2000}},
        { "aId": 8, "da": 1, "o": {"duration": 500}},
        { "aId": 9, "e": ".elem6", "p": { "left": "0%"}, "o": {duration": 3000, "delay" : 500}},
    ]
}
```

At step 412, the playback engine 150 determines whether to generate additional scene timing maps. For example, the playback engine 150 may determine whether there any more video scenes 160 in the video request 112 that need to be processed and added to the scene timing map. The playback engine 150 returns to step 404 in response to determining to generate another scene timing map. The playback engine 150 proceeds to step 414 in response to determining not to generate additional scene timing maps.

At step 414, the playback engine 150 generates a video timing map based on the scene timing maps. An example of a video timing map is shown below in Table 3.

The video timing map comprises a set of timestamp entries that each reference a source scene ID 134 and an animation ID in the scene timing map. Referring to Table 3 as an example, the video timing map comprises timestamp entries with values of 0, 2, 3, 4, 8, 14, 16, 20, and 21. In this example, the value of the timestamp entry corresponds with a multiplier value for time units of 500 ms. For instance, a timestamp entry value of two corresponds with 1000 ms or 1 second. A timestamp entry value of four corresponds with 2000 ms or 2 seconds. In other examples, the timestamp entry value may represent an instance in time. In some embodiments, the timestamp entry value may be a unit of time. Each timestamp entry is linked with a source scene ID 134 and an animation ID. For example, the first timestamp entry (shown as "t": 0) references the first source scene ID 134 (shown as "sId": 1) and the first animation ID (shown as "aId": 1), the second timestamp entry (shown as "t": 1) references the second source scene ID 134 (shown as "sId": 2) and the second animation ID (shown as "aId": 2), and so on. The video timing map may further comprise a total time for executing or presenting the interactive video or any other information associated with the interactive video.

TABLE 3

Example of a video timing map

```
{
    "map": [
        { "t": 0, "d": { "sId": 1, "aId": 1}},
```

TABLE 3-continued

Example of a video timing map

```
        { "t": 2, "d": { "sId": 1, "aId": 2}},
        { "t": 3, "d": { "sId": 1, "aId": 3}},
        { "t": 4, "d": { "sId": 1, "aId": 4}},
        { "t": 8, "d": { "sId": 1, "aId": 5}},
        { "t": 14, "d": { "sId": 2, "aId": 6}},
        { "t": 16, "d": { "sId": 2, "aId": 7}},
        { "t": 20, "d": { "sId": 2, "aId": 8}},
        { "t": 21, "d": { "sId": 2, "aId": 9}},
    ],
    "totalTime": 14300
}
```

At step 416, the playback engine 150 links a progress bar 308 with the video timing map. The progress bar 308 is a user interface that allows the user to select time instances within the interactive video. In one embodiment, the progress bar 308 is a slider bar. In other embodiments, the progress bar 308 may be represented using any other suitable representation as would be appreciated by one of ordinary skill.

At step 418, the playback engine 150 displays the progress bar 308 with a video scene 160 from the interactive video. An example of displaying a progress bar 308 with a video scene 160 is shown in FIG. 3. An example of using the progress bar 308 to display a particular portion of the interactive video is described in FIG. 5.

In one embodiment, the interactive HTML video may comprise one or more interactive HTML elements that are embedded in a video scene. A video scene 160 may have a button, a slider, shortcut, or any other suitable type of interactive HTML element embedded in a video scene 160. For example, a video scene 160 may comprise a button that triggers the playback engine 150 to provide web content when the button is pressed by a user 110. In other examples, interactive HTML elements may be configured to trigger any other actions to be performed by the playback engine 150. In one embodiment, the playback engine 150 is configured to pause the progression of the progress bar 308 when the interactive HTML element is activated (e.g. pressed or manipulated) by a user 110. For example, the playback engine 150 may suspend the progression of a progress bar 308 when a user 110 presses an interactive HTML element to access web content and may resume the progression of the progress bar 308 when the user 110 returns the original video scene.

Progress Bar Operation Process

FIG. 5 is a flowchart of an embodiment of an interactive video synchronization method 500 for an interactive video. As discussed above, interactive HTML videos do not follow a linear timeline or have a one-to-one correspondence between time and video scenes because of their variable timing characteristics. The playback engine 150 may employ method 500 to synchronize video scenes in an interactive HTML video.

At step 502, the playback engine 150 displays a video scene 160 from an interactive video and a progress bar 308. For example, the playback engine 150 may generate an interactive HTML video and a progress bar 308 using the techniques previously described. For instance, the playback engine 150 may use a process similar to the process described in FIG. 5 for generating an interactive HTML video and progress bar 308.

At step 504, the playback engine 150 receives a user input at the progress bar 308 that indicates a time instance value. For example, the progress bar 308 may be represented as a slide bar and a user 110 may use a cursor on the slide bar to indicate a time instance value. In other examples, a user 110 may use any other suitable technique for indicating a time instance value.

At step 506, the playback engine 150 determines whether the time instance value is present in the video timing map. The playback engine 150 compares the indicated time instance value to the timestamp entries in the video timing map to determine whether the time instance value matches any of the timestamp entries. The playback engine 150 proceeds to step 508 in response to determining that the time instance value is not present in the video timing map. The playback engine 150 proceeds to step 510 in response to determining that the time instance value is present in the video timing map.

At step 508, the playback engine 150 selects the closest timestamp entry in the video timing map. Here, the playback engine 150 selects the timestamp entry that closest matches the indicated time instance value. In one embodiment, the playback engine 150 selects a timestamp entry that immediately precedes the indicated time instance value when the time instance value is not present in the video timing map. Referring to Table 3 as an example, the playback engine 150 may receive a time instance value of ten and may select the timestamp entry with a value of eight as the closest timestamp entry.

Returning to step 506, the playback engine 150 proceeds to step 510 in response to determining that the time instance value is present in the video timing map. At step 510, the playback engine 150 selects a timestamp entry corresponding with the time instance value.

At step 512, the playback engine 150 identifies a source scene ID 134 and an animation ID linked with the selected timestamp entry. Referring to Table 3 as an example, the playback engine 150 may select a timestamp entry with a value of eight and may identify the source scene ID 134 (shown as "sId": 1) and the animation ID (shown as "aId": 5) linked with the selected timestamp entry. The source scene ID 134 and the animation ID are used to reference entries and information in a scene timing map. Continuing with the previous example, the playback engine 150 may use the identified source scene ID 134 and the animation ID to determine which video scene 160 and element to display. In addition, the playback engine 150 may use the identified source scene ID 134 and the animation ID to identify other information related to the video scene 160 and element such as properties and time durations. At step 514, the playback engine 150 displays a video scene 160 from the interactive HTML video that corresponds with the source scene ID 134.

At step 516, the playback engine 150 determines whether the timestamp entry is associated with a delay. The playback engine 150 may use the identified source scene ID 134 and the animation ID with the scene timing map to determine whether the timestamp entry corresponds with a delay. Referring to Table 3 as an example, the timestamp entry linked with the first source scene ID 134 (shown as "sId": 1) and the second animation ID (shown as "aId": 2) is associated with a delay having a time duration of 500 ms. As another example, the timestamp entry linked with the first source scene ID 134 (shown as "sId": 1) and the fourth animation ID (shown as "aId": 4) is not associated with a delay. The playback engine 150 proceeds to step 518 in response to determining that the timestamp entry is associated with a delay. The playback engine 150 proceeds to step 522 in response to determining that the timestamp entry is not associated with a delay.

At step 518, the playback engine 150 identifies a delay duration. The delay duration is equal to the time duration that is linked with the delay in the scene timing map. Referring to Table 3 as an example, the delay duration associated with the first source scene ID 134 (shown as "sId": 1) and the second animation ID (shown as "aId": 2) is 500 ms.

At step 520, the playback engine 150 displays an element corresponding with the identified animation ID after the delay duration elapses. For example, the playback engine 150 may first display the video scene 160 identified by the source scene ID 134 and then wait for an amount of time equal to the delay duration to elapse before displaying the element corresponding with the animation ID.

Returning to step 516, the playback engine 150 proceeds to step 522 in response to determining that the timestamp entry is not associated with a delay. At step 522, the playback engine 150 displays an element corresponding with the identified animation ID. In this example, the playback engine 150 may display the element without waiting a predetermined amount of time after displaying the video scene 160 corresponding with the source scene ID 134.

Video Buffering Process

FIG. 6 is a flowchart of an embodiment of a video buffering method 600 for an interactive video. This process reduces the amount of time required to start playing an interactive video by segmenting the interactive video into segments that can be individually rendered and queued for display. For example, a first video scene 160 of an interactive video can be rendered and displayed to a user 110 without having to wait for all of the video scenes 160 of the interactive video to be rendered before playing the interactive video. This process also enables parallel processing to provide additional performance improvements for the underlying computing system. Since this process allows an interactive video to be broken down into multiple segments, the computing system can process multiple segments in parallel to further reduce the amount of time it takes to begin playing an interactive video.

At step 602, the scene managing engine 140 receives a video request 112 that comprises source scene information 132 and animation instructions 204. The source scene information 132 generally comprises instructions for generating video scenes 160 for an interactive video. The animation instructions 204 identify animations 164 that are associated with the video scenes 160 for the interactive video. As an example, the scene managing engine 140 may receive a video request 112 that comprises source scene information 132 similar to the source scene information 132 that is described in FIG. 2. The source scene information 132 may comprise information for a plurality of video scenes 160 that form an interactive video. For example, the source scene information 132 may comprise a plurality of source scene identifiers 134 that each corresponds with the video scenes 160 of an interactive video. The source scene identifiers 134 may be arranged numerically in the order that a video scene 160 is to be presented in an interactive video.

At step 604, the scene managing engine 140 generates a video timing map 700 data structure. Here, the scene managing engine 140 generates a video timing map 700 by creating a data structure that comprises a plurality of entries that can be used to store information that is associated with video scenes 160 for an interactive video. For example, the scene managing engine 140 may generate a video timing map 700 as a multi-dimensional array, a matrix, a table, or any other suitable type of data structure. Referring to FIG. 7 as an example, a video timing map 700 comprises a plurality of video scene entries 702. Each video scene entry 702 is configured to store information that is associated with a particular video scene 160 from an interactive video. Each video scene entry 702 may comprise a start time 714, a run time duration 706, a source scene identifier 134 that corresponds with a video scene 160, information about elements that are present in the video scene, audio instructions, HTML code for the video scene 160, transition information, animation information, and/or any other suitable type of information that is associated with a video scene 160. The start time 714 corresponds with a time on a progress bar 308 when the video scene 160 is scheduled to play in the interactive video. The run time duration 706 corresponds with the amount of time it takes for the video scene 160 to finish playing all of its animations 164. The scene managing engine 140 initially set the run time duration 706 to a value of zero and then update the run time duration 706 after populating a video scene entry 702. An example of updating the run time duration 706 is described below in step 612.

In the example shown in FIG. 7, the video timing map 700 comprises two video scene entries 702. The first video scene entry 702 A is associated with a first source scene identifier 134 and a second video scene entry 702 B is associated with a second source scene identifier 134. The video scene entries 702 are arranged in the order that video scenes 160 are to be displayed to a user 110 while playing the interactive video. Each video scene entry 702 is linked with one or more animation entries 704 that correspond with the animations 164 that are present in a video scene 160. The size of the video timing map 700 is dynamic and can be adjusted to accommodate any suitable number of video scenes 160 and animations 164. For example, scene managing engine 140 may be configured to add or remove video scene entries 702 and/or animation entries 704 at any time.

After generating the video timing map 700 data structure, the scene managing engine 140 may begin populating the video timing map 700 with information from the received source scene information 132. Returning to FIG. 6 at step 606, the scene managing engine 140 identifies a video scene 160 from the source scene information 132. For example, on the first iteration, the scene managing engine 140 may begin by selecting source scene identifier 134 with the smallest value (e.g. a value of one) that corresponds with the first video scene 160 in an interactive video. On subsequent iterations, the scene managing engine 140 may then select another source scene identifier 134 with the next largest value which corresponds with the next video scene 160 in the interactive video.

At step 608, the scene managing engine 140 populates a video scene entry 702 in the video timing map 700 for the identified video scene 160 with a source scene identifier 134. For example, on the first iteration, the scene managing engine 140 may populate the first video scene entry 702 in the video timing map 700. The first video scene entry 702 in the video timing map 700 corresponds with the first video scene 160 that will play when the interactive video plays. In this example, the scene managing engine 140 populates the first video scene entry 702 with the source scene identifier 134 for the first video scene 160. In subsequent iterations, the scene managing engine 140 may begin populating the next available video scene entry 702 in the video timing map 700.

At step 610, the scene managing engine 140 identifies animation instructions 204 for animations 164 that are associated with the identified video scene 160. Referring to the example in FIG. 2, the scene managing engine 140 may identify the animation instructions 204 that are associated with the selected video scene 160 and its source scene information 132.

Returning to FIG. 6 at step 612, the scene managing engine 140 populates one or more animation entries 704 in the video timing map 700 for the identified video scene 160 based on the identified animation instructions 204. Here, the scene managing engine 140 begins populating the animation entries 704 of the selected video scene entry 702 with information about the animations 164 that are associated with the video scene 160. Returning to the example in FIG. 7, on the first iteration, the scene managing engine 140 may begin by populating the first video scene entry 702A with the source scene identifier 134 for the first video scene 160. The scene managing engine 140 may then begin filling in the animation entries 704A, 704B, 704C, 704D, and 704E with the information about the animations 164 that are presented during the first video scene 160. The animation entries 704 are arranged in the order that an animation 164 appears in the video scene 160. In this example, each animation entry 704 comprises a timestamp 710 for when an animation 164 is scheduled to begin playing on a progress bar 308 and an animation identifier 712 that identifies the animation 164 that is to be played.

In one embodiment, the scene managing engine 140 is configured to set the timestamps 710 for the animation entries 704 such that the first animation entry 704 begins at a time zero. The scene managing engine 140 then sets the timestamps 710 for subsequent animation entries 704 based on the run time of the preceding animation entry 704. Continuing with the example in FIG. 7, the scene managing engine 140 sets the timestamp 710 for the first animation entry 704A with a value of zero seconds. In this example, the animation 164 associated with the first animation entry 704A may have a run time of two seconds. The scene managing engine 140 may then set the timestamp 710 for the second animation entry 704B with a value of two seconds. The scene managing engine 140 may repeat this process for all of the timestamps 710 for the animation entries 704. After populating the animation entries 704 for the video scene entry 702, the scene managing engine 140 may determine a run time duration 706 for the video scene 160 and may update the run time duration 706 in the video scene entry 702 with the determined value. In this example, the scene managing engine 140 updates the run time duration 706 in the video scene entry 702 with a value of ten seconds which corresponds to the cumulative run time for the animations 164 within the video scene 160.

Continuing with the example in FIG. 7, on the next iteration, the scene managing engine 140 may begin populating the second video scene entry 702B with the source scene identifier 134 for the second video scene 160. The scene managing engine 140 may then begin filling in the animation entries 704F, 704G, 704H, and 704I with the information about the animations 164 that are presented during the second video scene 160. In this example, the scene managing engine 140 sets the timestamp 710 for the first animation entry 704F in the second video scene entry 702B with a value of zero seconds. The animation 164 associated with the first animation entry 704F may have a run time of one second. The scene managing engine 140 may then set the timestamp 710 for the next animation entry 704G with a value of one second. The scene managing engine 140 may repeat this process for all of the timestamps 710 for the remaining animation entries 704 associated with the second video scene entry 702B.

After the animation entries 704 have been populated for the video scene entry 702, the scene managing engine 140 then determined whether the video timing map 700 has been populated with information for all of the video scenes 160 in the interactive video. Returning to FIG. 6 at step 614, the scene managing engine 140 determines whether there are any additional video scenes 160 in the source scene information 132 to process. The scene managing engine 140 returns to step 606 in response to determining that there are additional video scenes 160 in the scene information to process. In this case, the scene managing engine 140 returns to step 606 to obtain information for generating additional video scene entries 702 for the video timing map 700. The scene managing engine 140 proceeds to step 616 in response to determining that there are other video scenes 160 in the source scene information 132 to process. In this case, the scene managing engine 140 has successfully generated all of the video scene entries 702 for the interactive video.

After the scene managing engine 140 populates all of the video scene entries 702 in the video timing map 700, the scene managing engine 140 may determine a total run time 708 for the interactive video based on the run time durations 706 of the all the video scene entries 702. Returning to the example in FIG. 7, the first video scene entry 702A comprises a run time duration 706 of ten seconds and the second video scene entry 702B comprises a run time duration 706 of four seconds. In this example, the scene managing engine 140 accumulates the run time durations 706 for all the video scene entries 702 to obtain a value of fourteen seconds for the total run time 708 for the interactive video. The scene managing engine 140 may update the video timing map 700 to include the determined total run time 708 for the interactive video. The total run time 708 for the interactive video may be used when generating a progress bar 308 for the interactive video.

After the video timing map 700 has been generated and populated, the scene managing engine 140 may output the video timing map 700 by storing it in a memory and/or by sending the video timing map 700 to the playback engine 150. The playback engine 150 may then begin using the video timing map 700 to start rendering video scenes 160 for the interactive video. Returning to FIG. 6 at step 616, the playback engine 150 identifies a video scene 160 from the populated video timing map 700. For example, the playback engine 150 may iteratively begin selecting video scenes 160 in order from the video timing map 700. On the first iteration, the playback engine 150 may identify and select a first video scene 160 that corresponds with the first video scene entry 702 in the video timing map 700. On the second iteration, the playback engine 150 may identify and select a second video scene 160 that corresponds with the second video scene entry 702 in the video timing map 700. The playback engine 150 may repeat this process for each subsequent iteration until all of the video scene entries 702 have been selected from the video timing map 700.

At step 618, the playback engine 150 renders the identified video scene 160. After identifying a video scene entry 702 from the video timing map 700, the playback engine 150 may then use information from the video scene entry 702 to identify a source scene identifier 134 for the video scene 160 and animation identifiers 712 that are associated with the video scene 160. The playback engine 150 may then render the video scene 160 using the identified source scene identifier 134 and the identified animation identifier 712. The playback engine 150 is configured to identify HTML code that is associated with the source scene identifier 134 and the animation identifier 712 and to compile the identified HTML code to render the video scene 160. For example, the playback engine 150 may obtain and compile the HTML code that is associated with the source scene identifier 134 and the animation identifier 712 from the scene source information 132 that is associated with the interactive video. The playback engine 150 may be configured to compile the HTML code locally or to send the HTML code to a remote location for processing. For example, the playback engine 150 may send an Application Programming Interface (API) request that comprises the HTML code to a remote server for processing to render a video scene 160.

After the playback engine 150 compiles the HTML code for the video scene 160, the video scene 160 is ready to be displayed to a user 110 on a graphical user interface 906. The playback engine 150 may begin displaying the rendered video scene 160 before rendering and displaying subsequent video scenes 160. In other words, the playback engine 150 is configured to begin playing each video scene 160 as they become available without having to wait for all of the video scenes 160 in the interactive video to be rendered. The playback engine 150 may also store or queue the rendered video scene 160 to play at a later time if the rendered video scene 160 is not scheduled to play immediately. For example, the playback engine 150 may store the rendered video scene 160 until the current video scene 160 has finished playing and then may present the rendered video scene 160.

At step 620, the playback engine 150 determines whether there are any other video scenes 160 in the video timing map 700 to process. For example, the playback engine 150 may increment a counter each time the playback engine 150 selects a video scene entry 702 from the video timing map

700. The playback engine 150 may then compare the current count to the number of video scene entries 702 in the video timing map 700. The playback engine 150 may determine that there are other video scenes 160 in the video timing map 700 to process when the current count has a value that is less than the number of video scene entries 702 in the video timing map 700. The playback engine 150 may determine that there are no more video scenes 160 in the video timing map 700 to process when the current count has a value that is equal to the number of video scene entries 702 in the video timing map 700.

The playback engine 150 returns to step 616 in response to determining that are other video scenes 160 in the video timing map 700 to process. In this case, the playback engine 150 returns to step 616 to select another video scene entry 702 to process and render. Otherwise, the playback engine 150 terminates method 600 in response to determining that there are no more video scenes 160 in the video timing map 700 to process. In this case, the playback engine 150 has successfully rendered all of the video scenes 160 for the interactive video.

Video Previewing Process

FIG. 8 is a flowchart of an embodiment of a video previewing method 800 for an interactive video. This process allows a user 110 to preview a video scene 160 from an interactive video without having to render all of the video scenes 160 in the interactive video. For example, a user 110 can hover a cursor of the progress bar 308 of an interactive video to search for a particular part of the interactive video. This process is unlike the preview feature that is used for traditional videos. Traditional videos are composed of a large number of still images. Each video scene in a traditional video corresponds with one of the still images. In these types of videos, the preview feature simply displays a still image that is located at a particular time within the video. In contrast, to display a video scene 160 from an interactive video, the HTML code that is associated with a video scene 160 needs to be obtained and compiled to render the video scene 160. In addition, the video scenes 160 in an interactive video are dynamic and their content may vary based on how a user 110 interacts with the interactive video. Method 800 provides a process that dynamically obtains and compiles the HTML code for rendering a video scene 160 so that it can be provided as a preview for a user 110.

At step 802, the playback engine 150 displays a video scene 160 and a progress bar 308. Referring to FIG. 9 as an example, the playback engine 150 may display a video scene 160 and a progress bar 308 on a graphical user interface 906 for a user 110. Examples of a graphical user interface 906 include, but are not limited to, a web page and a media player.

Returning to FIG. 8 at step 804, the playback engine 150 receives a user input at the progress bar 308 that indicates a time instance value. For example, the user 110 may use a cursor 902 to indicate time on the progress bar 308 that the user 110 is interested in previewing. Referring again to FIG. 9, the progress bar 308 is shown as a slide bar. In this example, the user 110 may hover a cursor 902 over a portion of the slide bar to indicate a time instance value. In other examples, the user 110 may use their finger, a stylus, or any other suitable technique for indicating a time instance value.

At step 806, the playback engine 150 identifies a source scene identifier 134 for the closest video scene 160 in the video timing map 700 based on the time instance value. Here, the playback engine 150 uses the video timing map 700 to determine which video scene 160 is scheduled to play at a time that corresponds with the time instance value. The playback engine 150 may use the run time durations 706 that are associated with each video scene 160 to determine which video scene 160 corresponds with the time instance value. Referring to the example in FIG. 7, the first video scene 160 is configured to play from zero seconds to ten seconds and the second video scene 160 is configured to play from ten seconds to fourteen seconds. In this example, the playback engine 150 will select the first video scene 160 when the time instance value corresponds with a value between zero seconds and ten seconds. The playback engine 150 will select the second video scene 160 when the time instance value corresponds with a value between ten seconds and fourteen seconds. In the event that the time instance value does not match a timestamp for a video scene 160 in the video timing map 700, the playback engine 150 will select the video scene entry 702 that immediately precedes the time instance value.

Returning to FIG. 8 at step 808, the playback engine 150 identifies an animation identifier 712 for the closest animation 164 within the identified video scene 160 in the video timing map 700 based on the time instance value. Here, the playback engine 150 uses a process that is similar to the process described in step 806 to determine which animation 164 is scheduled to play at a time that corresponds with time instance value. The playback engine 150 may use timestamps 710 that are associated with each animation identifier 712 to determine which animation 164 corresponds with the time instance value.

Referring again to the example in FIG. 7, the playback engine 150 will identify a first video scene entry 702A for the first video scene 160 when the time instance value has a value of four seconds. In this example, the playback engine 150 will use the timestamps 710 that are associated with the first video scene entry 702A to identify which animation 164 corresponds with the time instance value. In this case, the playback engine 150 identifies the fourth animation entry 704D that corresponds with a time of four seconds. This means that the playback engine 150 determines that the animation 164 that is associated with the fourth animation identifier 712 corresponds with the time instance value. In the event that the time instance value does not match a timestamp 710 in the video timing map 700, the playback engine 150 will select the animation entry 704 that closest precedes the time instance value. For example, the playback engine 150 will select the fifth animation entry 704E when the time instance value corresponds with a time between eight seconds and ten seconds.

Returning to FIG. 8 at step 810, the playback engine 150 renders the video scene 160 corresponding with the identified source scene identifier 134 and the identified animation identifier 712. Continuing with the previous example, where the time instance value corresponds with a time of four seconds, the playback engine 150 will render the video scene 160 that corresponds with video scene identifier 134 from the first video scene entry 702A and the animation identifier 712 from the fourth animation entry 704D. The playback engine 150 may render the video scene 160 using a process similar to the process described in step 618 of FIG. 6. For example, the playback engine 150 is configured to identify HTML code that is associated with the source scene identifier 134 and the animation identifier 712 and to compile the identified HTML code to render the video scene 160. The playback engine 150 may obtain and compile the HTML code that is associated with the source scene identifier 134 and the animation identifier 712 from the scene source information 132 that is associated with the interactive video.

In some embodiments, the playback engine 150 is configured to obtain HTML code that is associated with other animations 164 when the identified video scene 160 has one or more other animations 164 that are configured to play before the identified animation 164. Continuing with the previous example, the playback engine 150 will obtain and compile HTML code that is associated with the animations 164 from the first animation entry 704A, the second animation entry 704B, the third animation entry 704C, and the fourth animation entry 704D. This process allows the playback engine 150 to accurately compile the identified video scene 160 as it would appear with all its animations 164 at the time that corresponds with the time instance value.

At step 812, the playback engine 150 scales the rendered video scene 160 to fit a preview frame 904. The playback engine 150 scales the video scene 160 by reducing the size of the rendered video scene 160 to fit a preview frame 904. Returning to the example in FIG. 9, while an interactive video is playing, its video scenes 160 are presented to a user 110 in a graphical user interface 906. A preview frame 904 is a scaled version of the graphical user interface 906 for a video scene 160. In this example, the preview frame 904 is scaled to be about 10 % of the size of the graphical user interface 906. In other words, the dimensions of the preview frame 904 are 10% of the dimensions of the graphical user interface 906. In other examples, the preview frame 904 may be scaled to have dimensions with any other suitable percentage of the dimensions of the graphical user interface 906. The playback engine 150 may compress or quantize the rendered video scene 160 to scale the video scene 160 to be presented within the preview frame 904. In other examples, the playback engine 150 may employ any other suitable technique for reducing the size of the rendered video scene 160 to fit the preview frame 904.

Returning to FIG. 8 at step 814, the playback engine 150 displays the scaled video scene 160 in the preview frame 904. Returning to the example in FIG. 9, the playback engine 150 presents the scaled rendered video scene 160 within the preview frame 904 to provide a preview of the content where the user 110 has their cursor 902 on the progress bar 308. In FIG. 9, the playback engine 150 displays the scaled video scene 160 in a preview frame 904 that is overlaid onto a portion of the video scene 160 that is currently being presented in the graphical user interface 906. In other examples, the playback engine 150 may present the scaled video scene 160 is a preview frame 904 that is not overlaid onto the video scene 160 that is currently being presented in the graphical user interface 906. For example, the preview frame 904 may be a separate display window that appears next to the graphical user interface 906 where the video scene 160 that is currently being presented.

In some embodiments, the playback engine 150 is configured to animate one or more moving animations 164 within the preview frame 904. For example, the playback engine 150 may activate or move the animations 164 within the preview frame 904. The playback engine 150 may repeat this process of generating preview frames 904 as the user 110 hovers their cursor 902 over different locations on the progress bar 308.

Video Modification Process

FIG. 10 is a flowchart of a video modification method 1000 for an interactive video. Traditional videos are static and are composed of a large number of still images. These types of videos cannot be modified once the video has started playing. This means that the file size of a traditional video remains constant. In contrast, interactive videos are dynamic and their content can be modified even while the interactive video is playing. For example, an interactive video may be configured to add new video scenes 160, to remove video scenes 160, or to modify the content of a video scene 160 while the interactive video is playing based on how a user 110 interacts with the interactive video. This feature can improve the efficiency of the system when providing content to a user 110. For example, an interactive video may begin with a few video scenes 160 and then may add additional video scenes 160 as necessary to the interactive video based on the user's 110 interaction with the interactive video. In this example, the underlying system can launch an interactive video using a reduced file size and then can later increase the file size of the interactive video as necessary. As another example, the file size of an interactive video can be reduced by removing video scenes 160 while the interactive video is playing based on the user's 110 interaction with the interactive video. This feature results in improved memory utilization and improved network bandwidth utilization.

At step 1002, the playback engine 150 displays a video scene 160. The playback engine 150 may display a video scene 160 on a graphical user interface 906 for a user 110. The video scene 160 comprises one or more elements that the user 110 can select or interact with. Examples of elements include, but are not limited to, buttons, sliders, switches, text fields, or any other suitable type of interactive element.

At step 1004, the playback engine 150 receives a user input that identifies an element in the video scene 160 that a user 110 has interacted with. For example, a user 110 may click on a button, toggle a switch, drag a slider, or perform any other suitable type of interaction with an element within the video scene 160. In one embodiment, the playback engine 150 may associate webhooks with elements in the video scene 160. In this example, the playback engine 150 is configured to detect a triggering event when the user 110 interacts with an element in the video scene 160 that is associated with a webhook. The trigging event provides information that identifies which element the user 110 interacted with. In some instances, the triggering event may also provide information about how the user 110 interacted with the element.

At step 1006, the playback engine 150 determines that the element is associated with modification instructions. The video timing map 700 may further comprise instructions that identify elements from the interactive video that are linked with modification instructions. Referring to FIG. 11 as an example, within a video scene entry 702, the video timing map 700 may identify a first element that is linked with a first set of modification instructions 1102, a second element that is linked with a second set of modifications instructions 1104, and a third element that is linked with a third set of modification instructions 1106. In this example, the first set of modification instructions 1102 comprise instructions 1104 for adding a video scene 160 to the interactive video. The process of adding a video scene 160 to an interactive video may also be referred to as scene injection. The second set of modification instructions 1106 comprise instructions 1108 for removing a video scene 160 from an interactive video. The third set of modification instructions 1110 comprise instructions 1112 for modifying the content within a video scene 160. The playback engine 150 is configured to determine whether the identified element is linked with any modification instructions by comparing the element identified in the user input to the elements in the video timing map 700 that are linked with modification instructions.

Returning to FIG. 10 at step 1008, the playback engine 150 determines whether the modification instructions are associated with a scene injection. The playback engine 150 determines that the modification instructions are associated with a scene injection when the modification instructions comprise a function or commands for adding a video scene 160 to an interactive video.

The playback engine 150 proceeds to step 1010 in response to determining that the modification instructions are associated with a scene injection. At step 1010, the playback engine 150 identifies source scene information 132 for a new video scene 160. In one embodiment, the modification instructions may comprise source scene information 132 or instructions for the new video scene 160. For example, the modification instructions may comprise a source scene identifier 134 and animation identifiers 712 for the new video scene 160. In this example, the modification instructions provide HTML code or instructions for where to find HTML code for rendering the new video scene 160. The modification instructions may also provide timing information about where the new video scene 160 should be inserted in the video timing map 700. The modification instructions may indicate a time value or may reference an existing video scene 160 where the new video scene 160 will be inserted. For example, the modification instructions may identify where to insert the new video scene 160 before or after an existing video scene 160.

At step 1012, the playback engine 150 inserts a video scene entry 702 for the new video scene 160 in the video timing map 700. Here, the playback engine 150 adds the new video scene 160 to the video timing map 700 so that it can be played at the correct time in the interactive video. For example, the playback engine 150 may insert a new video scene entry 702 and animation entries 704 for the new video scene 160 into the video timing map 700 for the interactive video.

At step 1014, the playback engine 150 renders the new video scene 160. The playback engine 150 may render the new video scene 160 using a process similar to the process described in step 618 of FIG. 6. For example, the playback engine 150 may obtain and compile HTML code that is associated with a source scene identifier 134 and an animation identifier 712 from the scene instructions that are associated with the new video scene 160 to generate the new video scene 160 for the interactive video.

Returning to step 1008, the playback engine 150 proceeds to step 1016 in response to determining that the modification instructions are not associated with a scene injection. At step 1016, the playback engine 150 determines whether the modification instructions are associated with a scene removal. The playback engine 150 determines that the modification instructions are associated with a scene removal when the modification instructions comprise a function or commands for removing a video scene 160 from an interactive video.

The playback engine 150 proceeds to step 1018 in response to determining that the modification instructions are associated with a scene removal. At step 1018, the playback engine 150 identifies a video scene 160 within the video timing map 700. For example, the modification instructions may comprise a source scene identifier 134 for the video scene 160 to be removed from the interactive video.

At step 1020, the playback engine 150 removes the identified video scene 160 from the video timing map 700. The playback engine 150 may identify a video scene entry 702 from the video timing map 700 that is associated with the identified video scene 160. For example, the playback engine 150 may identify a video scene entry 702 within the video timing map 700 that includes the source scene identifier 134 for the identified video scene 160. The playback engine 150 may then delete the video scene entry 702 and any associated animation entries 704 from the video timing map 700. This process reduces the size and the number of video scene entries 702 in the video timing map 700.

Returning to step 1016, the playback engine 150 proceeds to step 1022 in response to determining that the modification instructions are not associated with a scene removal. In this case, the playback engine 150 determines that modification instructions are associated with a video scene modification. A video scene modification may comprise functions or commands for editing animations 164, elements, or any other attributes of a video scene 160. At step 1022, the playback engine 150 identifies a video scene 160 within the video timing map 700. For example, the modification instructions may comprise a source scene identifier 134 for the video scene 160 to modify.

At step 1024, the playback engine 150 modifies a video scene entry 702 for the identified video scene 160 in the video timing map 700. The modification instructions further comprise instructions or commands for instructions or commands for editing animations 164, elements, or any other attributes of a video scene 160. As an example, the playback engine 150 may modify, remove, or add an animation 164 to the video scene 160 based on the modification instructions. As another example, the playback engine 150 may modify, add, or remove an element (e.g. a button or slider) from the video scene 160 based on the modification instructions. The playback engine 150 may modify any suitable type or number of attributes of the video scene 160 based on the modification instructions. In some instances, the modifications to the video scene 160 may increase or decrease the run time duration 706 for the video scene 160 and the interactive video. In this case, the playback engine 150 determines a time difference based on the modifications to the video scene 160. As an example, the playback engine 150 may determine a run time increase that is associated with the addition of an animation 164 to the video scene 160. As another example, the playback engine 150 may determine a run time decrease that is associated with the removal of an animation 164 from the video scene 160. The playback engine 150 uses the determined time difference that is associated with the modifications to the video scene 160 for updating the run time duration 706 for the video scene entry 702 and the progress bar 308 of the interactive video.

At step 1026, the playback engine 150 updates the progress bar 308. Here, the playback engine 150 updates the total run time 708 that is indicated by the progress bar 308 based on the modifications that were made to the interactive video. For example, the playback engine 150 may increase the total run time 708 that is indicated by the progress bar 308 after adding a new video scene 160 to the interactive video. As another example, the playback engine 150 may decrease the total run time 708 that is indicated by the progress bar 308 after removing a video scene 160 from the interactive video. As another example, playback engine 150 may increase or decrease the total run time 708 that is indicated by the progress bar 308 after making any other kind of modifications to a video scene 160 of the interactive video.

Hardware Configuration

FIG. 12 is a schematic diagram of an embodiment of network device 101 configured to create and play an interactive video using a markup language. The network node 101 comprises a processor 1202, a memory 1204, and a network interface 1306. The network device 101 may be configured as shown or in any other suitable configuration.

The processor 1202 comprises one or more processors operably coupled to the memory 1204. The processor 1202 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 1202 may be a programmable logic device, a microcontroller, a microprocessor, or any suitable combination of the preceding. The processor 1202 is communicatively coupled to and in signal communication with the memory 1204. The one or more processors are configured to process data and may be implemented in hardware or software. For example, the processor 1202 may be 8-bit, 16-bit, 32-bit, 64-bit or of any other suitable architecture. The processor 1202 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute instructions to implement a source scene database 130, a scene managing engine 140, and a playback engine 150. In this way, processor 1202 may be a special-purpose computer designed to implement function disclosed herein. In an embodiment, the source scene database 130, the scene managing engine 140, and the playback engine 150 are each implemented using logic units, FPGAs, ASICs, DSPs, or any other suitable hardware.

The source scene database 130, the scene managing engine 140, and the playback engine 150 are configured similar to the source scene database 130, the scene managing engine 140, and the playback engine 150 described in FIGS. 1-11, respectively. For example, the scene managing engine 140 may be configured to perform the steps of method 600 described in FIG. 6. The playback engine 150 may be configured to perform the steps of methods 800 and 1000 described in FIGS. 8 and 10, respectively.

The memory 1204 comprises one or more disks, tape drives, or solid-state drives, and may be used as an over-flow data storage device, to store programs when such programs are selected for execution, and to store instructions and data that are read during program execution. The memory 1204 may be volatile or non-volatile and may comprise read-only memory (ROM), random-access memory (RAM), ternary content-addressable memory (TCAM), dynamic random-access memory (DRAM), and static random-access memory (SRAM). The memory 1204 is operable to store source scene database instructions 1208, scene managing instructions 1210, playback instructions 1212, source scene information 132, video timing maps 700, data 1216, and/or any other data or instructions. The source scene database instructions 1208, the scene managing instructions 1210, and the playback instructions 1212 may comprise any suitable set of instructions, logic, rules, or code operable to execute the source scene database 130, the scene managing engine 140, and the playback engine 150, respectively. The source scene information 132 and video timing maps 700 are the same as the source scene information 132 and video timing maps 700 described in FIGS. 1-11, respectively. Data 1216 may comprise source scenes 132, scene collections 170, video scenes 160, HTML elements 162, animations 164, audio 166, transition effects 168, audio samples, text files, documents, images, video files, or any other suitable type of data.

The network interface 1206 is configured to enable wired and/or wireless communications. The network interface 1206 is configured to communicate data between network nodes 101 in the system 100 and/or any other system or domain. For example, the network interface 1206 may comprise a WIFI interface, a local area network (LAN) interface, a wide area network (WAN) interface, a modem, a switch, or a router. The processor 1202 is configured to send and receive data using the network interface 1206. The network interface 1206 may be configured to use any suitable type of communication protocol as would be appreciated by one of ordinary skill in the art.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. An interactive video generating device, comprising:
  a hardware network interface configured to receive video request comprising source scene information and animation instructions, wherein:
    the source scene information comprises instructions for generating a plurality of video scenes for a Hypertext Markup Language (HTML) video; and
    the animation instructions identify animations associated with video scenes from among the plurality of video scenes; and
  a processor operably coupled to the hardware network interface, and configured to:
    receive a video request for generating the plurality of video scenes for the HTML video;
    for each video scene from the plurality of video scenes:
      identify a video scene from the source scene information, wherein:
        the video scene comprises one or more elements that are interactable by a user;
        the one or more elements comprise a button, a slider, a switch, and a text field; and
      while the video scene is playing and when the user interacts with a particular element from among the one or more elements, the video scene is modified based at least in part upon a type of interaction with the particular element, such that the efficiency of providing context to the user is improved;

assign a video scene entry in a video timing map to the identified video scene, wherein assigning the video scene entry to the identified video scene comprises populating the video scene entry with:
a source scene identifier for the identified video scene;
a start time that identifies a time on a progress bar when the identified video scene is scheduled to play;
a run time that identifies an amount of time it takes for the identified video scene to play; and
HTML code for the identified video scene;

identify animation instructions for animations associated with the identified video scene from the source scene information;

populate the video scene entry in the video timing map based on the animation instructions for the animations that are associated with the identified video scene, wherein populating the video scene entry in the video timing map based on the animation instructions comprises:
generating a plurality of animation entries that each identifies:
an animation identifier that identifies an animation within the identified video scene; and
a timestamp that identifies a time when the animation is scheduled to play with respect to other animations for the identified video scene;
setting a timestamp for a first animation scheduled to play in the identified video scene to a value of zero seconds; and
setting subsequent timestamps for animation entries to a value in seconds based on a run time of preceding animations;

determine a runtime duration for the identified video scene based on timestamps for animations that are associated with the identified video scene; and
update the run time in the video scene entry based on the determined run time duration; and
output the video timing map.

2. The device of claim 1, wherein the processor is further configured to:
identify a first video scene entry for a first video scene in the video timing map;
render the first video scene by compiling HTML code that is associated with the first video scene;
display the first video scene on a graphical user interface;
identify a second video scene entry for a second video scene the video timing map, wherein the second video scene is configured to play after the first video scene; and
render the second video scene after displaying at least a portion of the first video scene.

3. The device of claim 2, wherein the processor is further configured to play the first video scene before the second video scene has finished rendering.

4. The device of claim 1, wherein the processor is further configured to:
determine a total run time for the HTML video based on the video timing map;
generate the progress bar for the HTML video based on the video timing map and the total run time for the HTML video; and
display the progress bar that is mapped to the total run time for the HTML video.

5. The device of claim 1, wherein outputting the video timing map comprises storing the video timing map in a memory.

6. An interactive video generating method, comprising:
receiving a video request that comprises source scene information for generating a plurality of video scenes for a Hypertext Markup Language (HTML) video and animation instructions that identify animations associated with video scenes from among the plurality of video scenes;

for each video scene from the plurality of video scenes:
identifying a video scene from the source scene information, wherein:
the video scene comprises one or more elements that are interactable by a user;
the one or more elements comprise a button, a slider, a switch, and a text field; and
while the video scene is playing and when the user interacts with a particular element from among the one or more elements, the video scene is modified based at least in part upon a type of interaction with the particular element, such that the efficiency of providing context to the user is improved;

assigning a video scene entry in a video timing map to the identified video scene, wherein assigning the video scene entry to the identified video scene comprises populating the video scene entry with:
a source scene identifier for the identified video scene;
a start time that identifies a time on a progress bar when the identified video scene is scheduled to play;
a run time that identifies an amount of time it takes for the identified video scene to play; and
HTML code for the identified video scene;

identifying animation instructions for animations associated with the identified video scene from the source scene information;

populating the video scene entry in the video timing map based on the animation instructions for the animations that are associated with the identified video scene, wherein populating the video scene entry in the video timing map based on the animation instructions comprises:
generating a plurality of animation entries that each identifies:
an animation identifier that identifies an animation within the identified video scene; and
a timestamp that identifies a time when the animation is scheduled to play with respect to other animations for the identified video scene;
setting a timestamp for the first animation scheduled to play in the identified video scene to a value of zero seconds; and
setting subsequent timestamps for animation entries to a value in seconds based on a run time of preceding animations;

determining a runtime duration for the identified video scene based on timestamps for animations that are associated with the identified video scene; and updating the run time in the video scene entry based on the determined run time duration; and outputting the video timing map.

7. The method of claim 6, further comprising:

identifying a first video scene entry for a first video scene in the video timing map;

rendering the first video scene by compiling HTML code that is associated with the first video scene;

displaying the first video scene on a graphical user interface;

identifying a second video scene entry for a second video scene the video timing map, wherein the second video scene is configured to play after the first video scene; and rendering the second video scene after displaying at least a portion of the first video scene.

8. The method of claim 7, further comprising playing the first video scene before the second video scene has finished rendering.

9. The method of claim 6, further comprising:

determining a total run time for the HTML video based on the video timing map;

generating the progress bar for the HTML video based on the video timing map and the total run time for the HTML video; and displaying the progress bar that is mapped to the total run time for the HTML video.

10. The method of claim 6, wherein outputting the video timing map comprises storing the video timing map in a memory.

11. A computer program comprising executable instructions stored in a non-transitory computer readable medium that when executed by a processor causes the processor to:

receive a video request that comprises source scene information for generating a plurality of video scenes for a Hypertext Markup Language (HTML) video and animation instructions that identify animations associated with video scenes from among the plurality of video scenes;

for each video scene from the plurality of video scenes:
identify a video scene from the source scene information, wherein:
the video scene comprises one or more elements that are interactable by a user;
the one or more elements comprise a button, a slider, a switch, and a text field; and
while the video scene is playing and when the user interacts with a particular element from among the one or more elements, the video scene is modified based at least in part upon a type of interaction with the particular element, such that the efficiency of providing context to the user is improved;

assign a video scene entry in a video timing map to the identified video scene, wherein assigning the video scene entry to the identified video scene comprises populating the video scene entry with:
a source scene identifier for the identified video scene;
a start time that identifies a time on a progress bar when the identified video scene is scheduled to play;

a run time that identifies an amount of time it takes for the identified video scene to play; and
HTML code for the identified video scene;

identify animation instructions for animations associated with the identified video scene from the source scene information;

populate the video scene entry in the video timing map based on the animation instructions for the animations that are associated with the identified video scene, wherein populating the video scene entry in the video timing map based on the animation instructions comprises:
generating a plurality of animation entries that each identifies:
an animation identifier that identifies an animation within the identified video scene; and
a timestamp that identifies a time when the animation is scheduled to play with respect to other animations for the identified video scene;
setting a timestamp for a first animation scheduled to play in the identified video scene to a value of zero seconds; and
setting subsequent timestamps for animation entries to a value in seconds based on a run time of preceding animations;

determine a runtime duration for the identified video scene based on the time stamps for animation that are associated with the identified video scene;

update the run time in the video scene entry based on the determined run time duration; and output the video timing map.

12. The computer program of claim 11, further comprising instructions that when executed by the processor causes the processor to:

identify a first video scene entry for a first video scene in the video timing map;

render the first video scene by compiling HTML code that is associated with the first video scene;

display the first video scene on a graphical user interface;

identify a second video scene entry for a second video scene the video timing map, wherein the second video scene is configured to play after the first video scene; and render the second video scene after displaying at least a portion of the first video scene.

13. The computer program of claim 12, further comprising instructions that when executed by the processor causes the processor to play the first video scene before the second video scene has finished rendering.

14. The computer program of claim 11, further comprising instructions that when executed by the processor causes the processor to:

determine a total run time for the HTML video based on the video timing map;

generate the progress bar for the HTML video based on the video timing map and the total run time for the HTML video; and display the progress bar that is mapped to the total run time for the HTML video.

* * * * *